United States Patent
Shisler et al.

(10) Patent No.: US 7,085,803 B1
(45) Date of Patent: Aug. 1, 2006

(54) PLATFORM-INDEPENDENT PROGRAMMABLE BATCH PROCESSING ENGINE

(75) Inventors: Harry E. Shisler, Buena Vista, CO (US); Kevin D. Reitz, Aurora, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 10/007,547

(22) Filed: Nov. 6, 2001

Related U.S. Application Data

(63) Continuation of application No. 08/743,201, filed on Nov. 5, 1996, now Pat. No. 6,801,926.

(51) Int. Cl.
G06F 15/16 (2006.01)
G06F 9/44 (2006.01)
G06F 17/30 (2006.01)

(52) U.S. Cl. .................. 709/201; 717/115; 718/101; 707/10

(58) Field of Classification Search ........ 709/201–203, 709/219, 224, 217, 246; 718/101; 717/114–115; 707/10, 4
See application file for complete search history.

(56) References Cited

U.S. PATENT DOCUMENTS

| | | | |
|---|---|---|---|
| 5,204,947 A | | 4/1993 | Bernstein et al. |
| 5,566,330 A | * | 10/1996 | Sheffield .................. 395/600 |
| 5,678,039 A | * | 10/1997 | Hinks et al. ............... 395/604 |
| 5,706,456 A | * | 1/1998 | Dupper et al. ............. 395/349 |
| 5,737,592 A | * | 4/1998 | Nguyen et al. .............. 707/4 |
| 5,826,258 A | * | 10/1998 | Gupta et al. ................. 707/4 |
| 6,038,562 A | * | 3/2000 | Anjur et al. ................. 707/10 |
| 6,065,002 A | * | 5/2000 | Knotts et al. ................ 707/4 |

* cited by examiner

Primary Examiner—Dung C. Dinh
(74) Attorney, Agent, or Firm—Townsend and Townsend and Crew LLP

(57) ABSTRACT

A data processing system includes a multitude of client computers and server computers, of various platform types, interconnected by a network. A batch processing engine permits an application resident on a client computer to specify processing to be performed by one or more of the computers connected to the network, regardless of the platform type of such computers. The batch processing engine is implemented in part by middleware.

20 Claims, 43 Drawing Sheets

| Date - 7/18/98 | | | Account Balance Report | | | Page - | 1 |
|---|---|---|---|---|---|---|---|
| Time - 15:05:19 | | | | | | | 1112 |
| Company 00070 | | | | | | | 1113 |
| Business Unit | Dst Acnt | SLD | January | February | March | | 1114 |
| 70 | 1105 | | 3.34 | | | | |
| 70 | 1105 | | | | | | |
| 70 | 1105 | | | | | | |
| 70 | 1110 | BBL | | | | | |
| 70 | 1110 | AAI | 17,444.47 | 87.47 | -51.93 | | |
| 70 | 1110 | BBL | 414,024.84 | 2,662.78 | -1,720.38 | | |
| 70 | 1110 | BBL | | | | | |
| 70 | 1110 | BBLGBP | | 6,167.60 | 1,037.00 | | |
| 70 | 1110 | BBLCBR | | -18.82 | 77.52 | | |
| 70 | 1110 | BBLGBP | | 2,624.26 | 2,410.50 | | |
| 70 | 1110 | SB | 101.37 | | | | |
| 70 | 1110 | SB | | | | | |
| 70 | 1110 | SB | | | | | |

| | | January | February | March | 1115 |
|---|---|---|---|---|---|
| Company 00070 | Totals | 428,414.07 | 12,643.08 | 4,760.15 | |

\* Note - The amounts published in this report are based on incomplete data — 1116

| Date - 7/18/98 | | | Account Balance Report | | | Page | |
|---|---|---|---|---|---|---|---|
| Time - 18:12:54 | | | | | | | 1122 |
| Company 00070 | | | | | | | 1123 |
| Business Unit | 70 | | Object Account: | *106 | Subsidiary | | 1124 |
| January | | 3.34 | February | | | March | |
| Business Unit | 70 | | Object Account: | *105 | Subsidiary | | |
| January | | | February | | | March | |
| Business Unit | 70 | | Object Account: | *105 | Subsidiary | | |
| January | | | February | | | March | |
| Business Unit | 70 | | Object Account: | *110 | Subsidiary | 83_ | |
| January | | | February | | | March | |
| Business Unit | 70 | | Object Account: | *110 | Subsidiary | 83_ | |
| January | | | February | | 10.00 | March | 4,181.44 |
| Business Unit | 70 | | Object Account: | *110 | Subsidiary | 83_ | |
| January | | 444,001.84 | February | | 2,582.70 | March | 1,700.88 |
| Business Unit | 70 | | Object Account: | *110 | Subsidiary | 83_ | |
| January | | | February | | | March | |
| Business Unit | 70 | | Object Account: | *110 | Subsidiary | 83_ABP | |
| January | | | February | | 8,105.50 | March | 4,037.00 |
| Business Unit | 70 | | Object Account: | *110 | Subsidiary | 83_OBP | |
| January | | | February | | 110.86 | March | 77.52 |
| Business Unit | 70 | | Object Account: | *110 | Subsidiary | 83_OBP | |
| January | | | February | | 14,144.01 | March | 7,414.71 |
| Business Unit | 70 | | Object Account: | *110 | Subsidiary | 83 | |
| January | | 101.00 | February | | | March | |

FIG.11B                                                              1121

| Date - 7/18/98 | | Net Profit Report | Page - | 2 |
|---|---|---|---|---|
| Time - 17:16:52 | | | | 1132 |
| Company 00070 | | | | 1133 |
| Account Description | January | February | March | 1134 |
| | *Revenues* | | | |
| Revenues - Class 1 | 72,200.00 | 73,230.00 | 70,100.00 | |
| Revenues - Class 2 | 14,900.00 | 14,920.00 | 14,900.00 | |
| Total Revenues | 87,100.00 | 88,150.00 | 85,000.00 | |
| | *Expenses* | | | |
| Direct Costs - Class 1 | 64,800.00 | 68,736.00 | 64,800.00 | |
| Direct Costs - Class 2 | 118,800.00 | 118,030.00 | 118,800.00 | |
| Total Direct Costs | -183,600.00 | -186,766.00 | -183,600.00 | |
| | *Profits / Loss* | | | |
| Total Profit / Loss | -96,500.00 | -98,616.00 | -98,600.00 | |

PLATFORM-INDEPENDENT PROGRAMMABLE BATCH PROCESSING ENGINE

RELATED APPLICATIONS

This application is a continuation application of U.S. patent application Ser. No. 08/743,201, entitled "Platform-Independent Programmable Batch Processing Engine", filed on Nov. 5, 1996, now U.S. Pat. No. 6,801,926, which is incorporated by reference in its entirety.

BACKGROUND AND FIELD OF THE INVENTION

This invention relates generally to client/server data processing systems, and specifically to systems permitting applications prepared on a client computer to be submitted for processing on any of a variety of connected server computers, which servers may be of different platform types.

Modern data processing systems are often implemented in "client-server" configurations in which a number of "client" computers, typically personal computers or workstations, communicate with one or more "server" computers and request such server computers to perform processing tasks.

In conventional client-server configurations, each client computer is required to be compatible in some manner with each server computer so that the client and server computers can understand one another. In some environments, this requirement is easily met, as each client and server computer is of the same platform type, e.g., UNIX, Windows, Macintosh OS. In other environments, special translation protocols are implemented to permit a particular client platform type to communicate with a particular server platform type.

As client-server systems become larger and serve entire enterprises, such as large corporations or institutions, conventional techniques for facilitating communication between and among client and server computers become more difficult to use, while the need for processing that is seamlessly distributed among the systems' constituent client and server computers generally increases.

For example, if a user of a particular client machine creates a particular report application program that provides a printed report of general value throughout the organization, it would be extremely valuable for other users, perhaps working with clients and servers of different platform types, to be able to use the report application program.

Some known systems restrict processing of the user-created application to the user's client computer in order to entirely avoid the problems caused by multiple platform types. Other systems process the user-created application on the client computer but allow access to databases stored on other computers on the network, typically by the use of a common database protocol such as the standard known as SQL. Input-output services are typically restricted either to directly attached devices or devices such as printers shared at a workgroup or local area network (LAN) level. These solutions may be adequate in some environments, but for applications that make intensive use of database or input-output facilities, such implementations result in significant processing delays.

Recognizing the need to reduce dependency on platform types in distributed processing systems, a number of known schemes have been developed that employ a layer of system services and protocols commonly known as "middleware" that operates at a level that is above each computer's operating system and network facilities but below each computer's specific set of application programs. For an overview of such known middleware techniques, see, e.g., P. Bernstein, *Middleware: A Model for Distributed System Services,* 39 COMMUNICATIONS OF THE ACM 2 at 86–98 (February 1996), the contents of which are hereby incorporated by reference as if fully set forth herein.

Still absent from the known art, however, is a system for allowing a user of a client computer to create an application program locally and run that application, as desired, either on the user's own client computer or any other computer that is connected by a network to the user's client computer.

In addition, enterprise-wide data processing systems commonly use a variety of databases and input-output devices, and the need remains for a system to allow such an application, regardless of which machine executes the application, to access any such database or input-output facilities that are connected to the network, again without regard to the type of platform on which such facilities are implemented.

SUMMARY OF THE INVENTION

In accordance with the present invention, a batch processing engine includes a design tool subsystem operable on a client computer that creates a set of specifications in response to user input. A processing subsystem located either on the client computer or on some remote computer performs processing in response to the specifications. A middleware subsystem is used for communication of the specifications to the processing subsystem.

In another aspect of the invention, the specifications are sent from the client computer to a server computer for storage, and are sent from the server computer to the processing subsystem for processing.

In another aspect of the invention, the network includes database facilities, and a database middleware subsystem directs access to the database facilities in accordance with the specifications.

In still another aspect of the invention, the network includes input-output facilities, and an input-output middleware subsystem directs access to the input-output facilities.

In yet another aspect of the invention, a remote computer that is processing an application in accordance with the specifications sends to the client computer completion data in response to completion of processing of the application.

In a further aspect of the invention, a remote computer processing an application in accordance with the specifications sends to the client computer error data in response to detection of an error in processing of the application.

In yet a further aspect of the invention, the input-output middleware subsystem selectively routes an input-output data stream to one of a plurality of input-output devices and converts the data stream to a format suitable for the selected one of the input-output devices.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 9 is a flow diagram of the Print Objects subprocess shown in

FIG. 4.

FIGS. 11A, 11B, and 11C illustrate exemplary reports produced by system 100.

FIG. 28 is a user interface screen for report properties.

FIG. 32 is a user interface screen for a final version of a report.

DESCRIPTION OF A PREFERRED EMBODIMENT

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
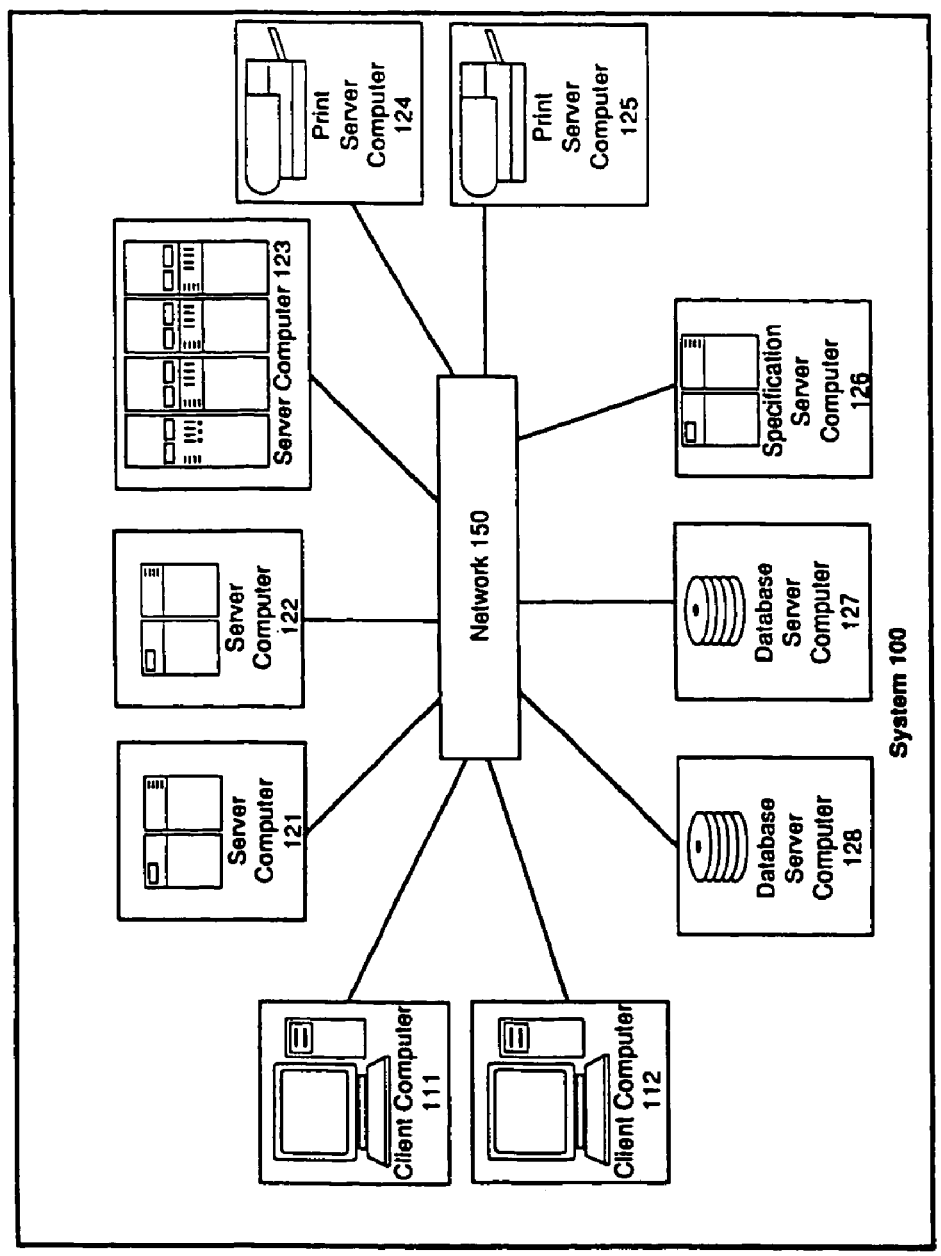
FIG. 1 is a block diagram of a system (100) for data processing in accordance with the present invention.

Referring now to FIG. 1, there is shown a system 100 for data processing in accordance with the present invention. The operation of system 100 is illustrated by discussion of the component parts illustrated in FIG. 1. As illustrated in FIG. 1, system 100 includes a number of client computers, e.g., 111, 112, and a number of server computers, e.g., 121–128, all of which are interconnected by a network 150.

In a preferred embodiment, client computers 111, 112 are implemented using conventional personal computer workstations, such as conventional machines using the Windows operating environment. It should be noted that in an alternate embodiment, not all of the client computers need be of the same platform type. For instance, in such an embodiment client computer 111 may be a Windows-based machine, while client computer 112 may be a UNIX-based workstation.

Similarly, server computers 121–128 may be of a variety of platforms. For example, in one embodiment server computers 121 and 122 are conventional mid-range server computers operating as UNIX platform machines, while server computer 123 is a mainframe host computer using the MVS operating system.

Server computers 124 and 125 are conventional print servers specifically designed to provide certain types of printing facilities. For instance, in one embodiment print server computer 124 is a conventional high speed shared-access laser printer and print server computer 125 is a high speed shared access line printer. It should be noted that these devices may or may not operate according to a common protocol.

Server computer 126 is a conventional server used as a repository of report templates as described below.

Server computers 127 and 128 are conventional database server computers specifically designed to provide database facilities. In one embodiment, database server 127 is a UNIX-based server computer implementing an Oracle@ relational database facility, and database server 128 is a Windows-based server computer implementing a SQL Server relational database facility.

Clients 111, 112 and servers 121–128 are interconnected by a conventional network 150. In a preferred embodiment, network 150 is implemented by conventional network hardware and software for implementation of local area networks (LANs) and wide area networks (WANs), providing, for instance, conventional "intranet" connectivity of computers 111, 112, and 121–128.

Figure 2:
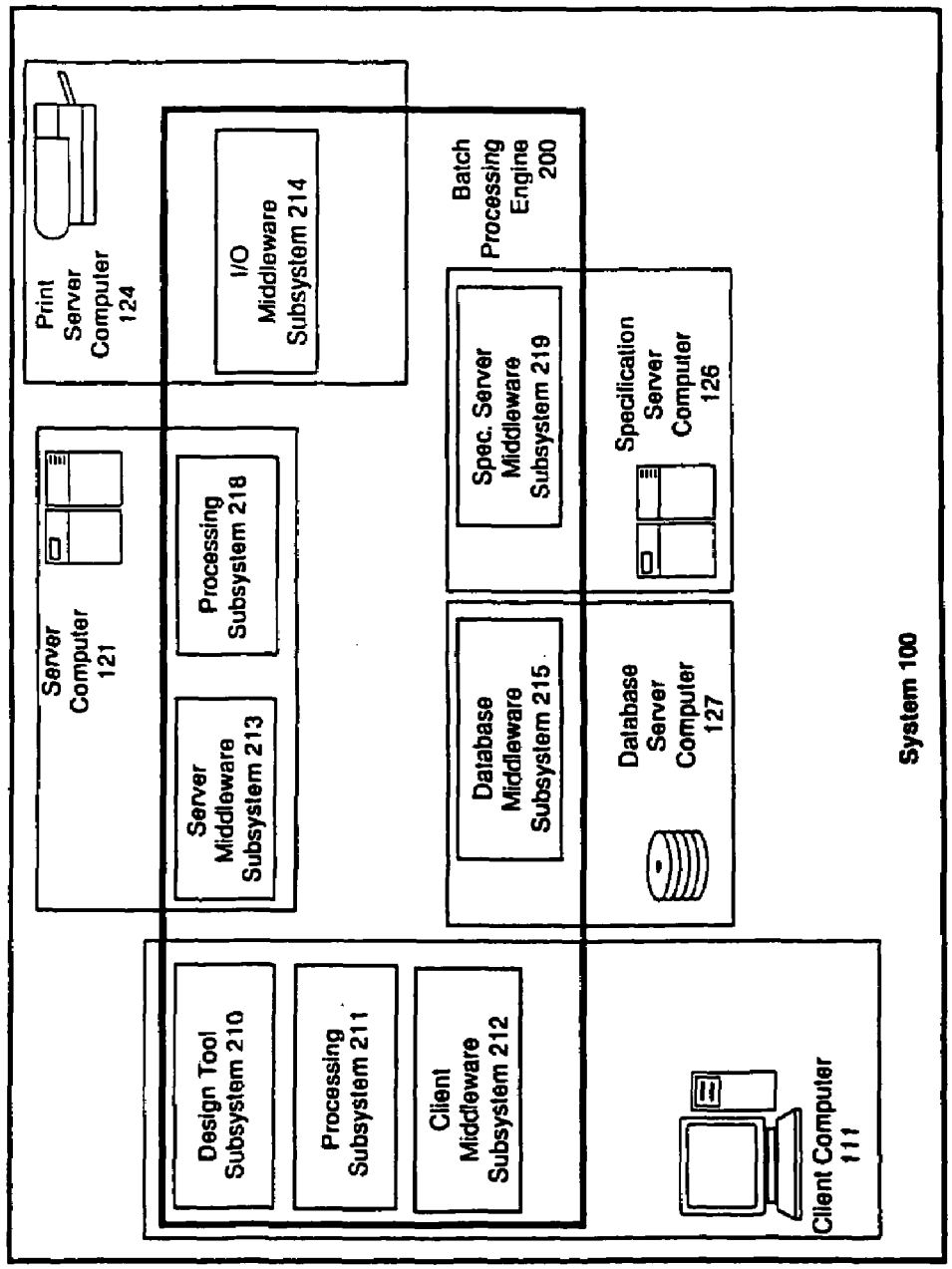
FIG. 2 is a block diagram of a batch processing engine (200), in accordance with the present invention.

Since the various computers connected using network 150 are of a variety of platform types, they cannot interoperate in a conventional manner. Therefore, to provide the features and advantages discussed above and referring now also to FIG. 2, system 100 includes a batch processing engine 200 implemented by the various components of system 100 illustrated in FIG. 1. Specifically, batch processing engine 200 includes a design tool subsystem 210, a local processing subsystem 211, a client middleware subsystem 212, a server middleware subsystem 213, an input/output middleware subsystem 214, and a database middleware subsystem 215.

Design tool subsystem 210 is an application software program operable on client computer 111. In a preferred embodiment, design tool subsystem 210 provides a user with facilities for requesting certain services from system 100, for instance a report of all customers whose names are stored in system 100 and who reside in the state of Colorado. In response to user input, design tool subsystem 210 generates a set of specifications describing the processing services desired by the user of client computer 111. For purposes of illustration, the example of reports is used for the description below, but other processing services are attainable in a similar manner as well.

Client middleware subsystem 212 and server middleware subsystem 213 are used to send messages to other computers in system 100 through a high level application programming interface (API) that insulates a programmer of system 100 from concerns about platform differences among the various computers of system 100. These conventional middleware subsystems send data files and launch processes across system 100 and also receive messages back from these processes, such as information about process completion or print files that can be viewed locally, e.g., by, client computer 111.

I/O middleware subsystem 214 provides print job management across system 100 through a high level API that insulates a programmer of system 100 from concerns about platform differences among the various computers of system 100. Subsystem 214, which is conventional input/output middleware, works in conjunction with a print server computer 124 to spool print jobs requested by one or more of the computers of system 100.

Subsystem 214 ensures delivery of print jobs and enables print jobs to be stopped, started, and repositioned. Subsystem 214 further provides for transformation of print job data streams from one or more formats supported by batch processing engine 200 into data streams not supported by batch processing engine 200 but available for use by print server computer 124.

Database middleware subsystem 215 provides access to a variety of databases, for instance implemented on database server computer 128 or other computers of system 100 through a high level API that insulates a programmer of system 100 from concerns about platform differences among the various computers of system 100. Subsystem 215 conventionally supports relational database operations, reads data from a database in a "logical view" manner that is independent of the physical organization of data; allows selection and sequencing of data; provides the ability to insert and update data, as well as commitment control (i.e., transaction processing) that allows a series of related changes to the database to be grouped together. These changes can subsequently be committed (i.e., applied) to the database or rolled back (i.e., canceled).

Figure 3:
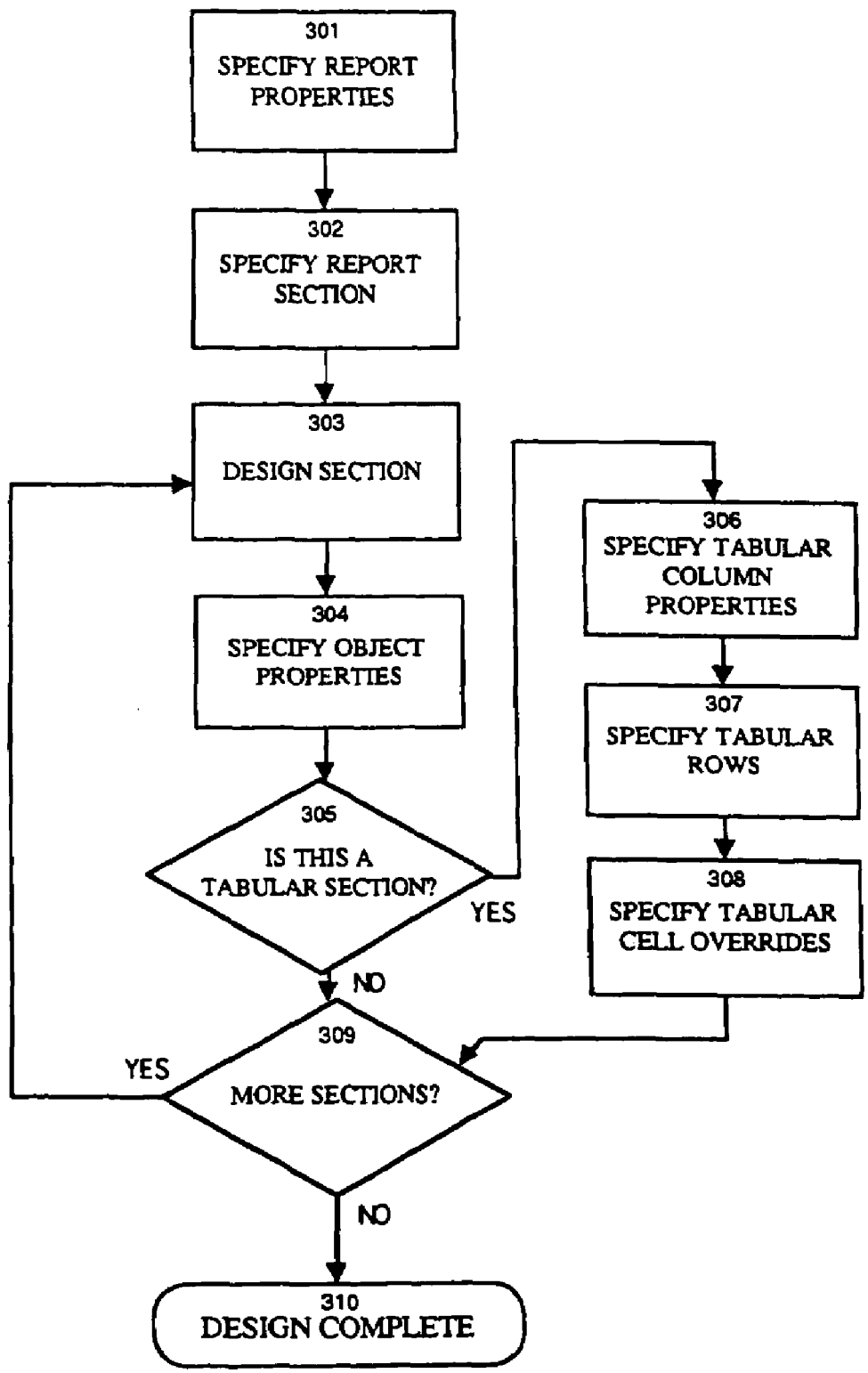
FIG. 3 is a flow diagram of processing for a design tool subsystem of the batch processing engine illustrated in FIG. 2.

Specifically, and referring now to FIG. 3, there is illustrated a flow diagram showing processing for design tool subsystem 210. In general, the report specifications generated by design tool subsystem 210 are stored initially on the client computer of the user who designed the report, e.g., 111. The specifications are conventionally stored in a binary format in a data management portion of the design tool subsystem 210. In a preferred embodiment, the data management portion is implemented in portable C language computer code that is executable on any of the client or server computers of system 100.

When a report is first designed, the specifications for the report are initially saved locally in design tool subsystem 210 of client computer 111 so that they may be used as a template for use in creating other reports. The specifications of the template are also sent for storage to specification server 126 so that they may be accessible to a second user of another computer in system 100. Specifically, the template is copied, or "checked in;" to specification server 126 from the client computer on which the template was created. The second user subsequently copies the template to the second user's client, e.g., 112, and uses the template as desired to create the second user's own version of the template for execution. In a preferred embodiment, it is these versions created from templates that are actually executed to generate the desired report rather than the templates themselves.

Through use of such versions, users are able to tailor report templates to their own particular needs. If such versions are of direct use to others, the versions may also be checked in to servers and thereby be made accessible to other users. In a preferred embodiment, versions that are checked in to a server may be executed directly on that server or may be executed remotely on any other computer of system 100. A given report may sort and select data in a particular way, may request certain output from a database, may include parameters that affect the logic of how the report is processed, may identify database sources and target locations for database outputs, use a particular layout, and include other parameters.

Through use of versions, a user may override such sorting, data selection, database output, execution time parameters, database source/target identifiers, report layout, and other parameters of a preexisting report that may not be applicable or helpful for that user.

Specifically, processing for design tool subsystem 301 commences by specifying properties that the user desires for a report. In a preferred embodiment, these properties include assignment of report defaults such as the font and color of text, numeric scaling factors for numeric quantities (e.g., writing numbers in terms of thousands or millions) for the presentation of numerical data in the report, a source database from which information for the report will be obtained, and a target database to which the report's data will be written. In addition, execution time report parameters such as user-defined options for selecting different depreciation methods are also selected. Other properties defining the report include the number of database records that are desired to process (such as the number of matches to seek), and whether numerical totals and grand totals are to be printed. It should be evident that other parameters and attributes of a report could also be specified. In addition, report-level C-language program code to perform any particular desired operation may also be selected by a user of client computer 111 and attached to events constituting the report, as detailed below.

Next, processing continues by specifying 302 section types for the report being designed. In a preferred embodiment, the available section types are a report header section, a page header section, a group section, a tabular section, a report footer section, a page footer section, and a columnar section. Referring now also to FIGS. 11 A–11C, there are shown an exemplary report with various sections. Referring now specifically to FIGS. 11A, there is shown a columnar section report 1111 having a page header section 1112, a level break header section 1113, a columnar section 1114, a level break footer section 1115, and a page footer section 1116.

A page header section prints at the top of a page whenever a page break event is issued. A page break event occurs whenever a page overflow occurs or when a data level break occurs and the user has specified that a page break event be issued for this level break. This section is free-form, meaning that objects can be arranged in any manner within it.

A level break header section is a section that prints at a data level break event. In the example of FIG. 11 A, this section is connected to a company number level break and prints whenever the company number changes. It is used to denote the beginning of a set of data sharing the same value for a given data item. This section is also free-form.

A columnar section consists of data items arranged in columns in a row. A column heading occurs above each item to identify the item. A row is printed for each database record retrieved. The level breaks that occur in this section trigger the printing of level break sections. In a preferred embodiment this section is not free-form, and objects are arranged in a single row with column headings above, as shown in FIG. 11 A.

A level break footer section is a section that prints at a data level break event. In this example, the section is connected to a company number level break and prints whenever the company number changes. It is used to denote the end of a set of data sharing the same value for a given data item and typically prints one or more totals for that item. This section is free-form.

A page footer section prints at the bottom of a page whenever a page break event is issued. It prints before the advance to the next page. It is typically used for a footnote, as shown in FIG. 11 A. This section is free form.

Referring now to FIG. 11 B, there is shown a group section report 1121 including a page header section 1122, a level break header section 1123, and a group section 1124. The page header section and level break header section are as described above.

A group section, unlike a columnar section, is free-form. Data item identifiers are typically placed to the left of the data item, but can be oriented in any manner in relation to the data item (e.g., to the right, above, below). A row is printed for each database record retrieved. The level breaks that occur in this section trigger the printing of level break sections. In the example of FIG. 1113, the same data from the columnar report is displayed in a free-form format. Although the level break footer and page footer sections do not exist in report 1121, group section reports can include these sections just as in columnar section reports.

Referring now to FIG. 11 C, there is shown a tabular section report 1131 including a page header section 1132, a level break header section 1133, and a tabular section 1134. The page header section and level break header section are as described above.

A tabular section is a variant on a columnar section, and consists of data items arranged in columns in a finite set of rows that the user defines. a column heading occurs above each item to identify the item. A row description is defined by the user for each row to identify the data in that row. Unlike a columnar section, database records are not printed as they are retrieved but rather are accumulated in the individual cells (i.e., intersections of columns and rows) in the section until a level break occurs. In the example of FIG. 11 C, data are accumulated in the cells until the company number value changes. If report 1131 was modified to level break on business unit as well as company number, the user would define a level break header section for each business unit as well and the report would produce a printed page for each business unit and for each company. Four types of rows are shown in FIG. 11 C. Underline rows are placed before Total Revenues and Total Direct Costs. The lines Revenues, Expenses, and Profits/Loss represent text rows. Revenues-Class 1, Revenues-Class 2, Direct Costs-Class 1 and Direct Costs-Class 2 are inclusion-type rows. These rows are associated with data selection criteria that determine the accumulation of database amounts into cells in the row. Total Revenues, Total Direct Costs, and Net Profit/Loss are calculation-type rows. A calculation associated with each of these rows defines a calculation that is to be applied to each cell in the row. For example, the row total revenues has a Calculation Revenues-Class 1+Revenues-Class 2 that is applied to the cells for January, February, and March.

Referring again to FIG. 3, once the various desired sections are specified 302 by the user, processing continues by designing 303 one of those sections. Specifically, a database logical view is associated with the section, or the section is designated as a section to be printed out where there is a level break in the data (e.g., information to be printed out whenever a company name changes in a list of data pertaining to many companies). For example, selected portions of a database table may be defined to be a view and that view may then be associated with the current section. Furthermore, section defaults are assigned, including in a preferred embodiment the font and text color for the section and the numeric scaling factor if they differ from the values globally set for the report. Section print properties are also assigned, including in a preferred embodiment whether there is to be a page break after printing or otherwise displaying the section, whether a page header is to be printed, and whether the section is to be visible at all in the printout (as opposed to not being a portion of the report printout). Additionally, section level C-language program code is selected by a user of client computer 111 and attached to events corresponding to the section. Still further, the user specifies inter-section relationships, such as parent/child relationships among sections and whether to connect level break headers and footers of the current section to those of another section.

For instance, a report may include company-specific information for each of several years and the yearly information for a company may have a child relationship with respect to the overall company information. Finally, database objects or user-defined objects are placed in the section by conventional graphical user interface "drag and drop" techniques in which objects are moved to their desired locations in the section by user manipulation of a pointing device such as a mouse. For instance, a user may select an object from a list of available database objects. Upon selecting an item, a rectangle appears at the cursor of the mouse in the section design window. This rectangle depicts the dimensions of the object to be placed in the section. When the user moves the pointing device in the window, the rectangle follows. In this manner, the user may visually place the object in the desired location in the report section.

By pressing the mouse button, the user creates the selected object at the location of the rectangle in the section. In a preferred embodiment, such objects include alphanumeric variables, date-type variables, constants, bit-map images, lines and other graphics.

Once a section is designed 303, the object properties for that section are specified 304. For each object, display properties are first assigned, including the font and text color for the object, a numeric scaling factor, display size, formatting, and the decimal presentation used for the object, underlines, overlines, and boxes used in presentation of the object, justification of display elements (e.g., text)-for the object, and whether the object is to be visibly displayed. Other properties are then assigned, including whether the object is to be treated as corresponding to a global variable (available throughout the report), whether the object is to cause printing only when a value corresponding to the object changes (such as a company name), whether level break totals for the object are to be printed, whether a grand total for the object is to be printed, and whether printing of the object is to be suppressed for a row in which total values are provided. For example, a table showing numbers of black & white and color televisions would not print an object specifying "black & white" or "color" in a row providing a total number of all television sets. Next, object-level C-language program code for performance of particular operations is attached to an event corresponding to the object so that it is processed with the object; calculation logic, if needed for the processing of the object, is attached to an event corresponding to the object; and the object is mapped to columns in a database by a dialog screen asking the user to specify which element of which database in system 100 corresponds with the object.

At this point, if the section is not a tabular section, i.e., corresponding to a spreadsheet-type format, the design of the section is complete, as indicated by routing 305, and processing flows to 309 as discussed below. If the section is a tabular section, tabular column properties are assigned 306. Specifically, data inclusion properties are assigned as needed, including attaching column inclusion C-language program code to an event corresponding to the section, data selection criteria, and column calculation logic. For example, column inclusion C-language program code can use an execution time, user-supplied parameter that defines the financial reporting period desired for a report. The C-language program would calculate a year-to-date amount based on the requested reporting period and this amount would be accumulated in the column. Data inclusion in a column could be further affected by adding data selection criteria to the column. For example, only budget amounts could be selected. This would result in the column accumulating only year-to-date budget amounts. A column's data could also be obtained from calculation of data from other columns. These other columns could derive their amounts from column inclusion properties or could themselves result from calculations.

After assigning 306 tabular column properties, tabular rows are specified 307. In a tabular section, data are collected into columns ("horizontal" distribution of data) through data inclusion properties as described above. These data are then distributed to the various rows defined for the table ("vertical" distribution of data). This process occurs for each record fetched from the database. A data inclusion row is a row that has data selection criteria attached to it. The data selection criteria determine which amounts included in each column will be accumulated in a given row. A calculation row, like a column calculation described above, derives its amounts from a calculation of data from other rows. These other rows derive their amounts from a data inclusion row or from calculations if they themselves are calculation rows. A free-form text row is a row of text that may be one or more lines in length. Text rows are usually used for table notation in a tabular report. Underline rows are lines drawn for each column in a row. They are typically used for underlines preceding a total.

Row display properties are then assigned, including row font and text color, numeric scaling factor, display size, formatting, and decimal place format, underlines, overlines, boxes, justification, and visibility. Row level C-language program code may then optionally be attached to an event corresponding to the row, and data inclusion properties are assigned by attaching row data selection criteria or row calculation logic to the row.

Processing then flows to specifying 308 tabular cell overrides. First cell display properties are assigned, including cell font and text color, numeric scaling factor, display size, formatting, decimal places, underlines, overlines, boxes, justification, and visibility. Cell level program code is then attached to the cell override, and data inclusion properties are assigned as needed, including attaching cell data selection criteria, and cell calculation logic to the cell override.

At this point, processing flows to a check 309 to determine whether there are more sections. If so, the next section is designed 303 as discussed above. Otherwise, the design is complete 310, and the specifications for the report are stored on client computer 111 or transferred to specification server 127 as directed by the user of client computer 111.

Processing subsystem 211 directs client computer 211 to perform the processing corresponding to the specifications produced by design tool subsystem 210 when the user has requested such processing to be performed locally (i.e., by client computer 111). Specifically, and referring now to FIG. 4, processing subsystem 211 performs processing on report applications designed as discussed above in connection with FIG. 3. Should the user direct a report to be processed on another computer, e.g., server computer 121, a processing subsystem 218 on that computer similarly performs processing based on the specifications for the report.

Figure 4:
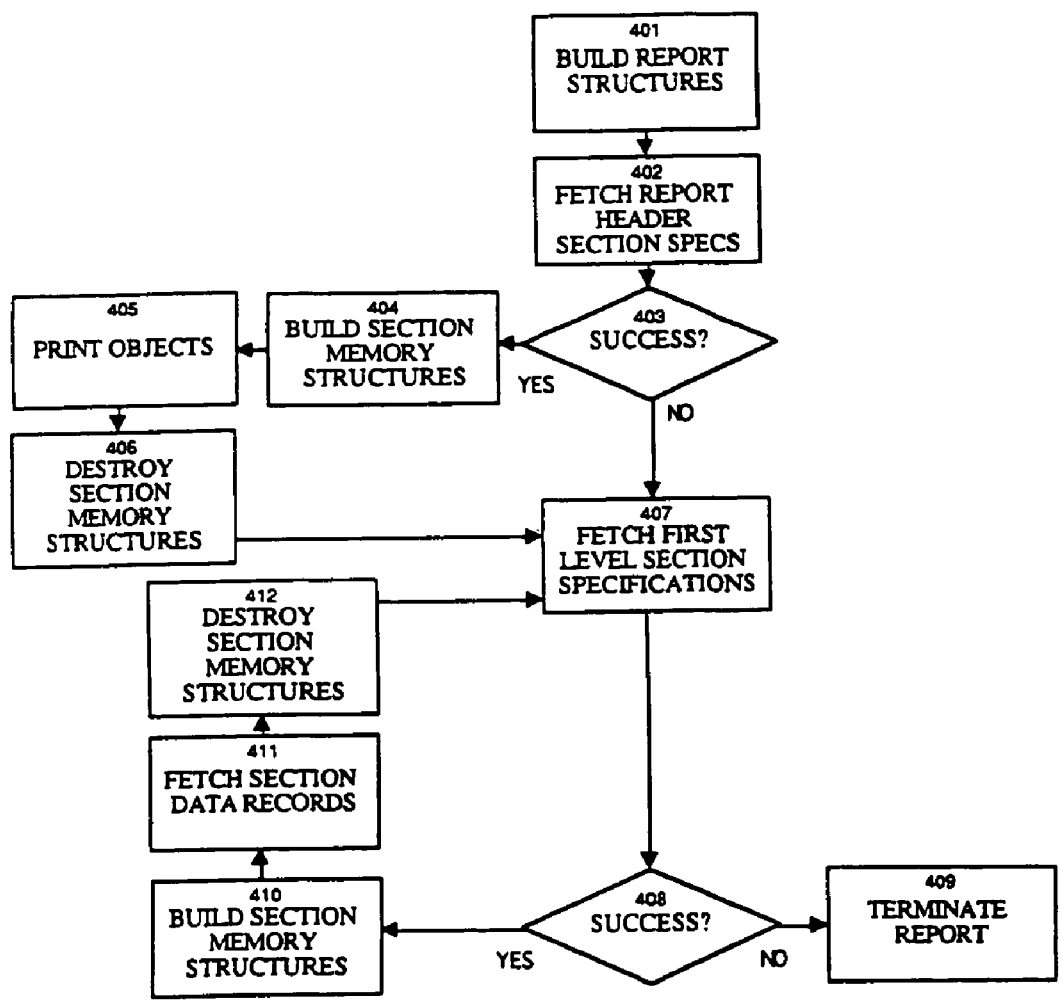
FIG. 4 is a flow diagram of processing for a processing subsystem of the batch processing engine illustrated in FIG. 2.

Traditionally, batch processing includes database manipulation and report generation. The processes illustrated in FIG. 4 provide both of these capabilities. Combining file processing with reports provides most of the aspects of traditional batch process jobs. FIG. 4 illustrates how local processing subsystem 211 of system 100, or a processing subsystem (e.g., 218) of another computer of system 100, performs such file and report processing.

Processing subsystem 211 processes, or "renders," reports from the top to bottom for sections and for top to bottom and left to right for objects within a section. In addition, sections are arranged hierarchically, with sections that do not depend on other sections (i.e., "level one sections") being processed before sections that depend on other sections (i.e., "level break header sections, level break footer sections, total sections that provide totaled quantities when a specified event occurs, children, and custom sections). All dependent sections are processed as if they were objects of the level one section upon which they depend. Thus, processing commences first for level one sections, top to bottom, and then for dependent sections and objects, top to bottom and left to right, as applicable. The general flow for each section being processed is to perform an "initialize section" event, a "do section" event, and an "end section" event, as more fully described below. An additional "advance section" event is used for sections that include a business view attached before the "do section" event; the "advance section" event reads the next record of the specified business view. In a preferred embodiment, local processing subsystem 211 allocates memory for each level one section and its-dependent objects at the time that the section is processed, and de-allocates memory when processing for that section is complete. In a preferred embodiment, memory for dependent sections and objects is not de-allocated until processing for the corresponding level one section is complete.

With specific reference now to FIG. 4, if a report header section is present, processing of a report by building 401 report-level memory structures. Specifically, memory is allocated for data structures to hold report-wide parameters such as text font, text color, and numeric scaling factors. Next, report header section specifications are fetched 402. A check is made 403 to see whether such specifications were found. If so, the memory structures for holding section information are built and populated based on the specifications. This information includes section-wide information such as text font, text color, and numeric scaling factors where those are to differ from their report-level counterparts. Every object in the section is also constructed in memory at this point, and custom program logic, known as event rules, may be executed at this point if custom code has been provided for this event; otherwise a flag is set so that when this event occurs again no search will be made for such non-existent custom code.

In general, an event is an action performed by a user or system 100 in the processing of a computing task. An event can be as simple as tabbing out of a quantity field, which can initiate a calculation for a "total" column; or it can be as complex as a change to a database record that initiates a series of events. In event rules programming, business functionality can be attached to particular events according to the needs of the organization. Changing application procedures is accomplished by changing the business rules executed at particular event points, which in many cases may be accomplished without writing programming code. Thus, the event rules allow system 100 to operate as a programmable batch engine.

The business rules mentioned above are reusable, encapsulated objects that are attached to the event points described above and initiated when the appropriate event occurs. For example, a sales order entry application consists of a number of business rules and procedures, such as check credit history, check inventory availability, commit inventory, determine pricing, select a freight carrier, and-so forth. Because business rules are implemented as polymorphic and encapsulated objects rather than lines of code in a procedural program, they can be changed and rearranged independently of the other objects constituting the application. These objects are obtained from an object repository or "librarian" and are attached to event points through a graphical user interface as described herein. New objects can be conventionally created by programmers in conventional computer languages that support dynamically linked libraries, including C, C++, COBOL, Fortran, and PL/1.

Figure 9:
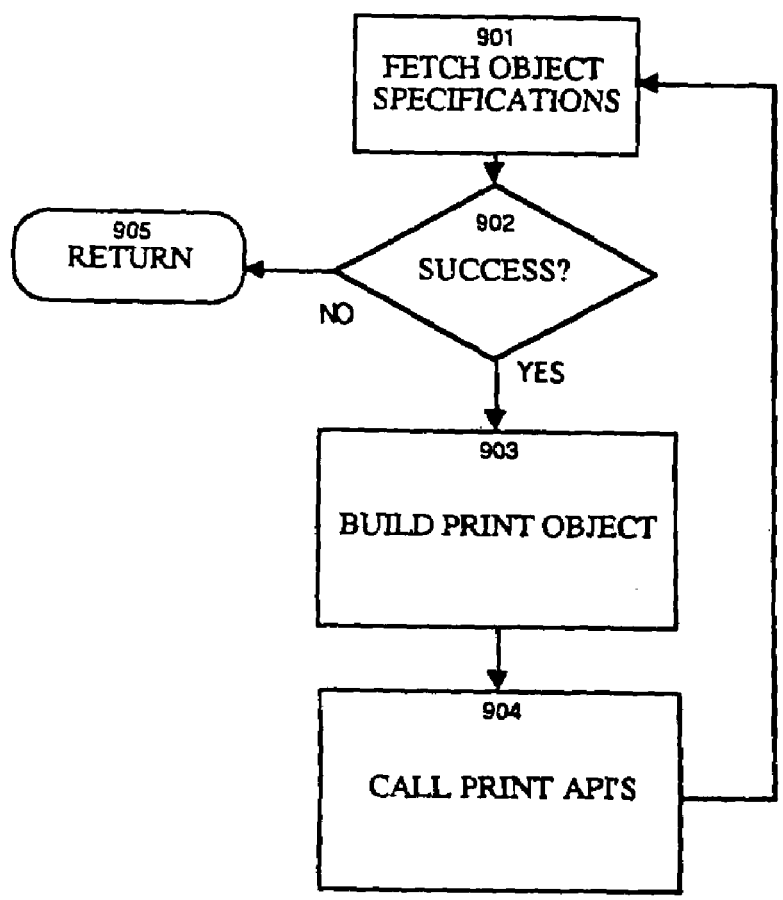

A print objects subprocess, more fully detailed below in connection with FIG. 9, is then called 405. After printing for the report header section has completed, the memory structures for the report header are destroyed 406 by de-allocating the memory used for them so that this memory may be used again for other purposes.

At this point, or if check 403 indicated that there was no report header section to process, an attempt is made 407 to fetch report specifications for a first level section, i.e., a section that is not subordinate to any other "parent" section. As described herein, sections may be hierarchically arranged so that one section is nested within another in a parent/child relationship, and this nesting may be an arbitrary number of layers deep. As first level sections are processed, they spawn child sections based on level breaks in the data retrieved into the section. As previously described, first level sections are processed from top to bottom spatially in the report, the placement having been determined through use of the design tool subsystem 210.

A check is made 408 to determine whether a first level section was successfully fetched, and if so, memory structures for the section are built 410 and populated based on the specifications. This information includes section-wide information such as text font, text color, and numeric scaling factors, where different from the corresponding report-level information. Every object in the section is also constructed in memory. Database request strings are constructed for data selection and sequencing. Event rules may also be processed at this time if custom code has been provided for this event; otherwise a flag is set so that when this event occurs again no search will be made for such non-existent custom code.

Next, section data records are fetched 411, as more fully detailed in connection with FIG. 6, and data for the section is printed. When processing of data for the section is completed, the memory structures for the section are destroyed 412, and an attempt is made to fetch 407 another set of first level section specifications. When check 408 indicates that there are no more first level section specifications, a terminate report subprocess 409 is invoked.

Figure 5:
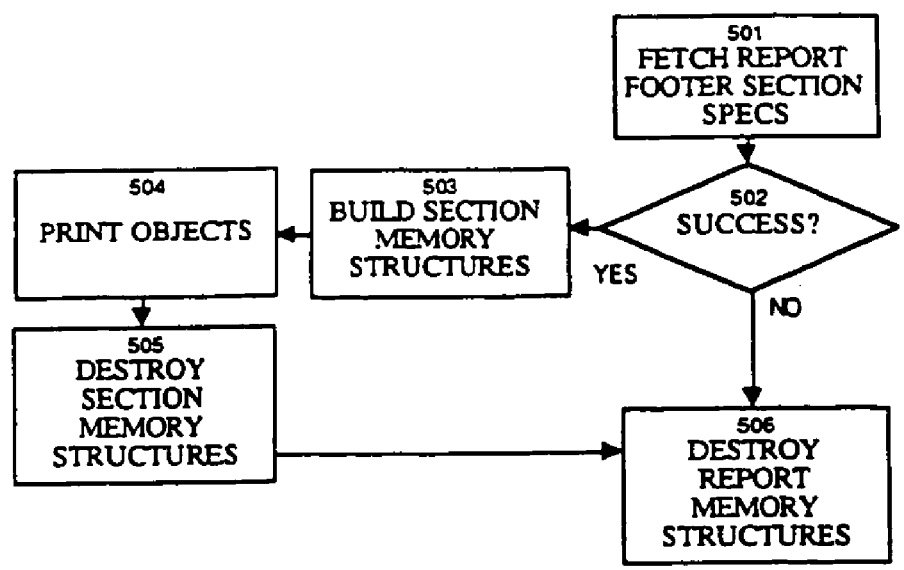
FIG. 5 is a flow diagram of the terminate report subprocess shown in FIG. 4.

Referring now to FIG. 5, there is illustrated a flow diagram for the terminate report subprocess 409. First, an attempt is made to fetch 501 report footer section specifications. If a check 502 indicates that specifications for a footer section were successfully fetched, the memory structures for information pertaining to the footer section are constructed 503 and populated based on the specifications. As previously explained, this information includes text font, color, and numeric scaling factors where they differ from, superordinate values. Every object in the section is also constructed in memory, and event rules are executed at this time if custom code has been provided for this event; otherwise a flag is set so that when this event occurs again no search will be made for such non-existent custom code. Then, the footer section objects are printed 504 as detailed below in connection with FIG. 9. When footer section printing is complete, all memory structures for this footer section are destroyed 505.

After footer section processing is complete, or if check 502 indicated that there were no footer sections, all memory structures for the report are destroyed 506, and processing for the report is complete.

Figure 6:
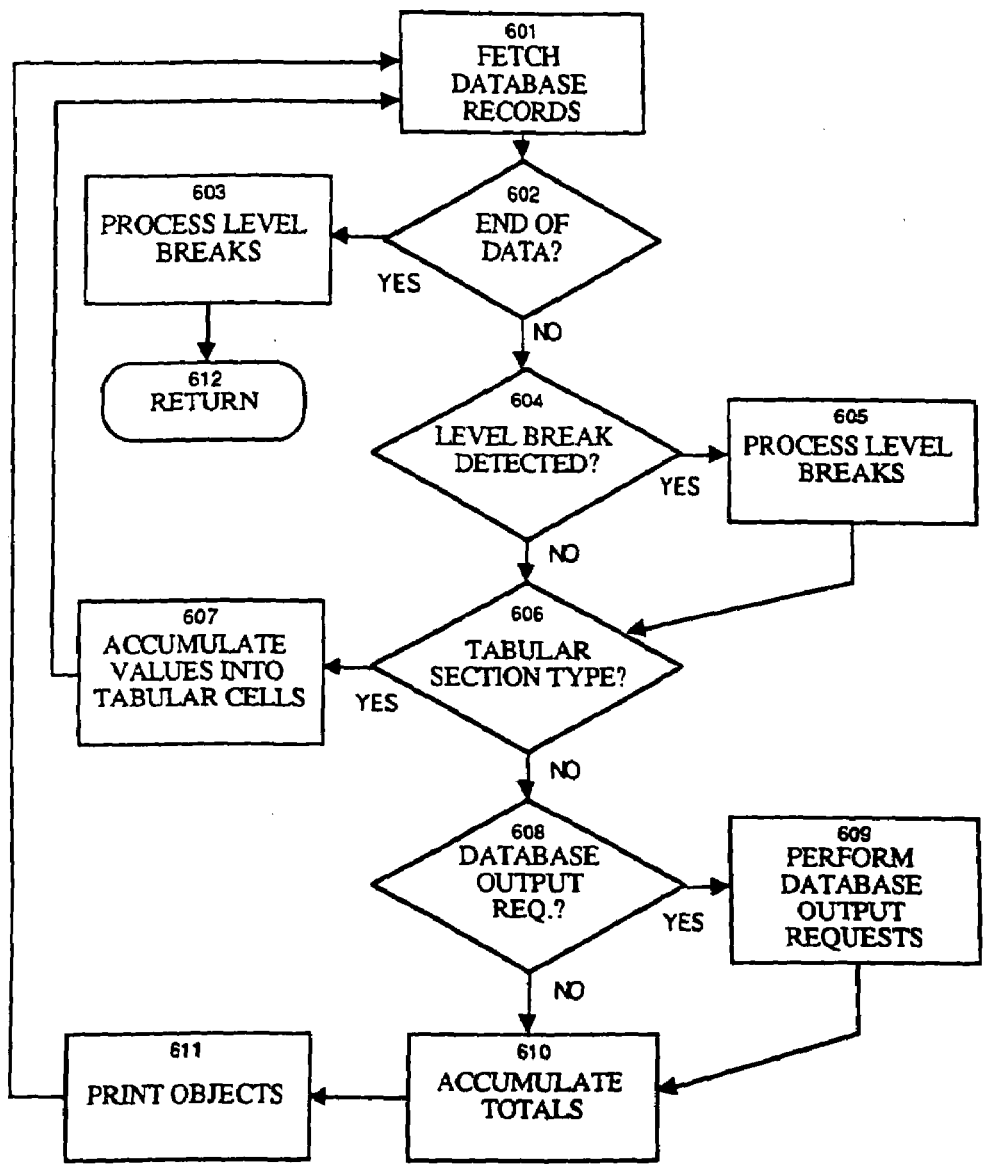
FIG. 6 is a flow diagram of the Fetch Section Data Records subprocess shown in FIG. 4.

Referring now to FIG. 6, there is shown a flow diagram for the fetch section data subprocess 411 of FIG. 4. First, an attempt is made to fetch a database record corresponding to the section. Prior to fetching a record, event rules are executed if custom code has been provided for this event; otherwise a flag is set so that when this event occurs again no search will be made for such non-existent custom code. If an end of data indication is encountered 602, a process level-breaks subprocess is run, as further described in connection with FIG. 7, to process all level breaks before terminating the section and returning 612 to the previous process. In one embodiment, a user may specify a maximum number of records to be processed and the end of data indication will be triggered once the specified maximum number of records has been processed.

If no end of data indication is encountered, a check is made 604 to determine whether a level break has been detected. A level break indicates a change in processing from one section to another in the hierarchy of nested parent/child sections as described above. Prior to testing for a level break, event rules may, be processed if custom code has been provided for this event; to otherwise a flag is set so that when this event occurs again no search will be made for such non-existent custom code. If a level break is detected, the process level breaks subprocess is run 605. In any event, a check 606 is then made to determine whether the current section is a tabular section type. If so, the values of the columnar objects in the section are accumulated into appropriate tabular rows and cells as determined by the specifications. Each tabular row and cell of a type known as TYPE_INCLUSION has associated with it data selection criteria. These are evaluated on a cell-by-cell basis in each row to determine if the columnar object value should be added to the cell. Tabular sections accumulate data and do not print until a level break or end of data indication occurs. Once tabular section processing 607 is completed, processing returns to fetch 601 additional database records.

If the section type was not a tabular section as determined by check 606, a check is made 608 to see whether database output requests have been made, such as an update of an existing record or an insertion of a new record into the database. If so, the requests are processed 609. If a section is not tabular, it may produce database output based on database output mapping specifications. These specifications determine which objects in the section, have their current values sent as output to database items. This output may be in the form of a record inserted into the database or selected values in the record may be updated from object values in the section.

In any event, any objects in the section that are designated to produce totals then have their current values added to corresponding accumulators for printing upon occurrence of a data level break. Finally, the print objects subprocess is executed 611 to print the objects in the section, and processing returns to fetch 601 another database record.

Figure 7:
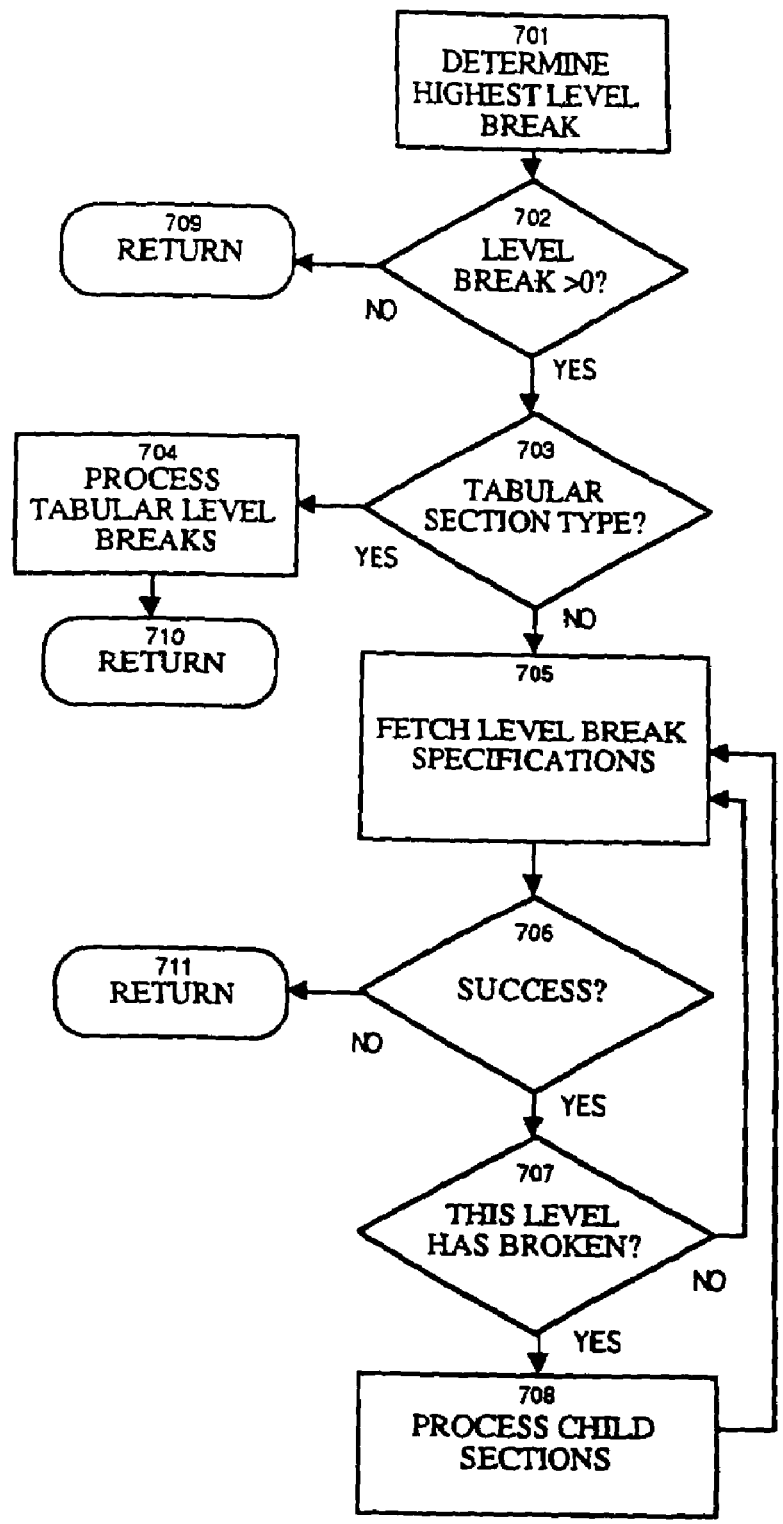
FIG. 7 is a flow diagram of the Process Level Breaks subprocess shown in FIG. 6.

Referring now to FIG. 7, there is illustrated a flow diagram for the level break subprocess. First, a determination is made 701 as to the highest level break that has occurred by comparing prior to current database values that are designated as level break items. A check is then made 702 to determine whether any level breaks have occurred. If not, processing returns 709 to the calling process. Otherwise, a check is made 703 to determine whether the current section is a tabular section type. If so, a process tabular level breaks subprocess is executed 704 as detailed in connection with FIG. 8, and processing then returns 710 to the calling process. If the current section is not a tabular section type, a level break specification is fetched 705. A level break specification identifies the object in the report that is being monitored for a data break and the level at which it occurs. The level break specification also carries the current and previous value for the object to determine when a break occurs. A flag in the specification indicates if a report page break should occur when a break is processed.

A check is then made 706 to determine whether a level break specification has been fetched. If no specification is retrieved, processing returns 711 to the calling process. Otherwise, a check is made 707 to determine whether the current level being processed is at a data break. If not, processing returns to fetch 705 another level break specification. If the current level being processed is determined to be at a data break, child section processing 708 takes place as detailed in connection with FIG. 10, and processing then fetches 705 the next level break specification.

Figure 8:
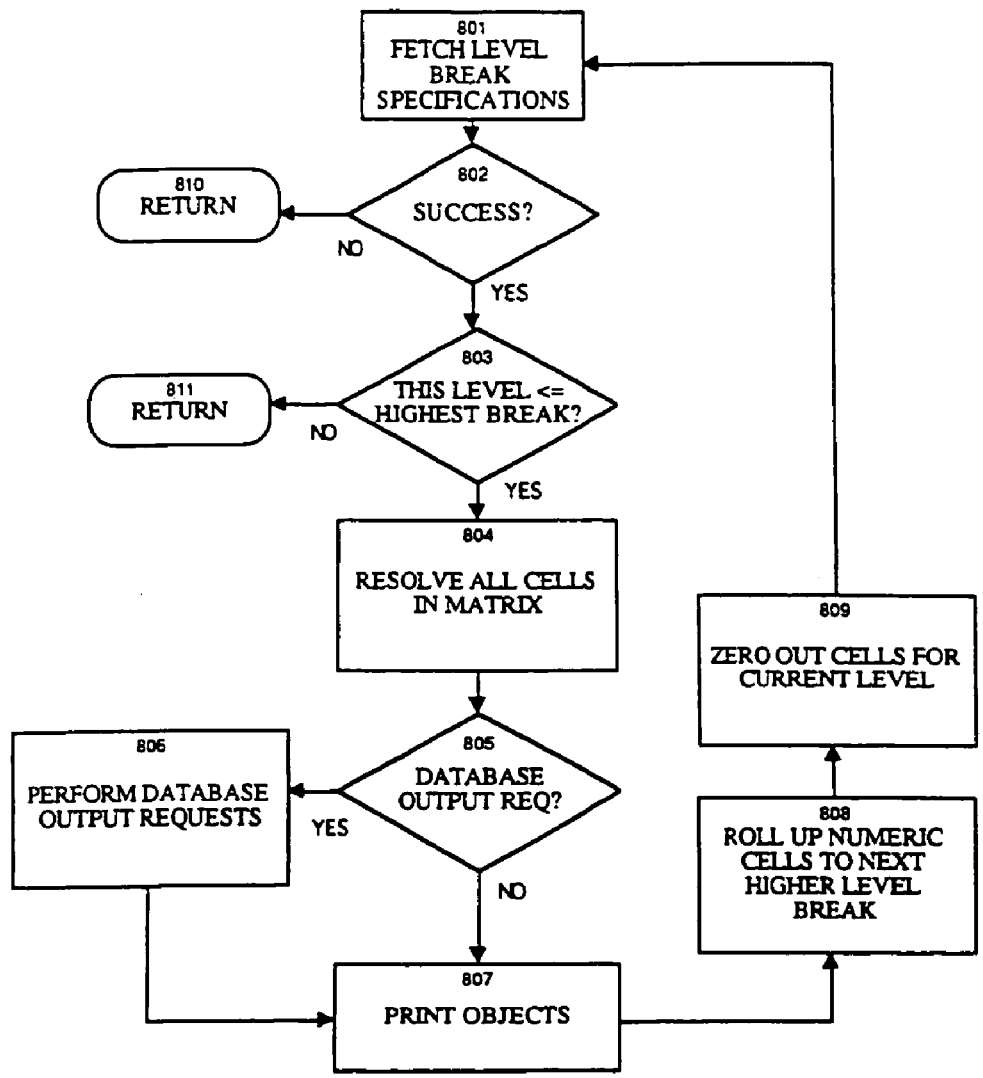
FIG. 8 is a flow diagram of the Process Tabular Level Breaks subprocess shown in FIG. 7.

Referring now to FIG. 8, there is illustrated a flow diagram for the tabular level break subprocess 704. Processing commences by fetching 801 level break specifications. A check is made 802 to determine whether specifications have successfully been retrieved. If no specification is received, processing returns 810 to the calling process. Otherwise, a check is made 803 to determine whether the current level is subordinate to the highest level that has had a level-break. If not, processing returns 811 to the calling process. Otherwise, processing continues by resolving 804 all cells in the current matrix of the lowest level tabular section. Specifically, column calculations, followed by row calculations, and finally cell calculations are performed for this matrix. Tabular sections print a section for every level break defined, starting with the lowest level break that has been defined and going up through every level including the highest level that has had a level break. For example, three level breaks may be defined: Company (the highest), Division, and Cost Center (the lowest). If a level break occurs for Cost Center only, then the section (matrix) is printed only for Cost Center and the values in the Cost Center matrix are accumulated into the Division matrix. If the highest level break occurs for Division, the section is printed for Cost Center and the values in the Cost Center matrix are accumulated into the Division matrix. The section is also printed for Division and the values in the Division matrix are accumulated into the Company matrix.

Next, a determination is made 805 to see whether any database output requests have been made, such as an update of an existing record or an insertion of a new record into the database from the rows in the matrix. If so, the requests are processed 806 based on the corresponding specifications. In any event, the print objects subprocess is then invoked 807 to print the objects in the section for the current level break. Next, Numeric cells in the current level break are added 808 to corresponding cells in the next higher level break. For example, if the current level provides totals for a division of a company, these values are added to overall company totals for the next higher level break in the report. All numeric cells at the current level are then initialized, 809 to zero in anticipation of subsequent data, the current level number is incremented by 1, and the next set of specifications are fetched 801 as described above.

Referring now to FIG. 9, there is shown a flow diagram of the print objects subprocess, e.g., 405. Processing commences by fetching 901 the specifications for the object to be printed. Prior to this fetching, event rules may be processed if custom code has been provided for this event; otherwise a flag is set so that when this event occurs again no search will be made for such non-existent custom code. If retrieval of the specifications is not successful, processing returns 905 to the calling process. Otherwise, a print object is built. Specifically, coordinates for the object on the print page are determined relative to the position of the last section that was printed. Any object that will not fit on the page is suspended from printing until a page advance occurs and any page header section or other section designated to print on a page break has printed. Space is also reserved at the bottom of the page for a page footer section if one is defined. Prior to determining theses print coordinates, event rules for the object may be executed if custom code has been provided for this event; otherwise a flag is set so that when this event occurs again no search will be made for such non-existent custom code. After determining the print coordinates, event rules for the object may be executed if custom code has been provided for this event; otherwise a flag is set so that when this event occurs again no search will be made for such non-existent custom code. The object is then converted into a printable character string based on display properties, e.g., edit codes, formatting rules, display length, display decimals, and the stored value which may not be in a printable format. This is done because numeric matrix cells are stored in an internal non-printable mathematical format, i.e., floating point, and call for conversion to a printable string formattable with commas, decimal points, credit signs, and the like prior to printing. When a page break occurs, event rules corresponding to the page break are executed if custom code has been provided for this event; otherwise a flag is set so that when this event occurs again no search will be made for such non-existent custom code.

Next, a set of application programming interfaces (APIs) are called 904 to implement the actual printing. The APIs call software code portions appropriate for the type of computing and printing hardware being used. An I/O middleware subsystem 214 is used to provide the platform-specific code to drive the actual printer being used. In this manner, batch processing engine 200 operates with the same program code on each supported platform, with the exception of a small amount of platform-specific middleware 214. The same approach is used for database accesses using database middleware system 215. A common set of APIs are thus used to access a variety of databases for both input and output of data. These APIs are then implemented in separate program code as appropriate for each database. After printing the object, event rules corresponding to the end of the object processing are executed if custom code has been provided for this event; otherwise a flag is set so that when this event occurs again no search will be made for such non-existent custom code. Processing then once again fetches 901 object specifications.

Figure 10:
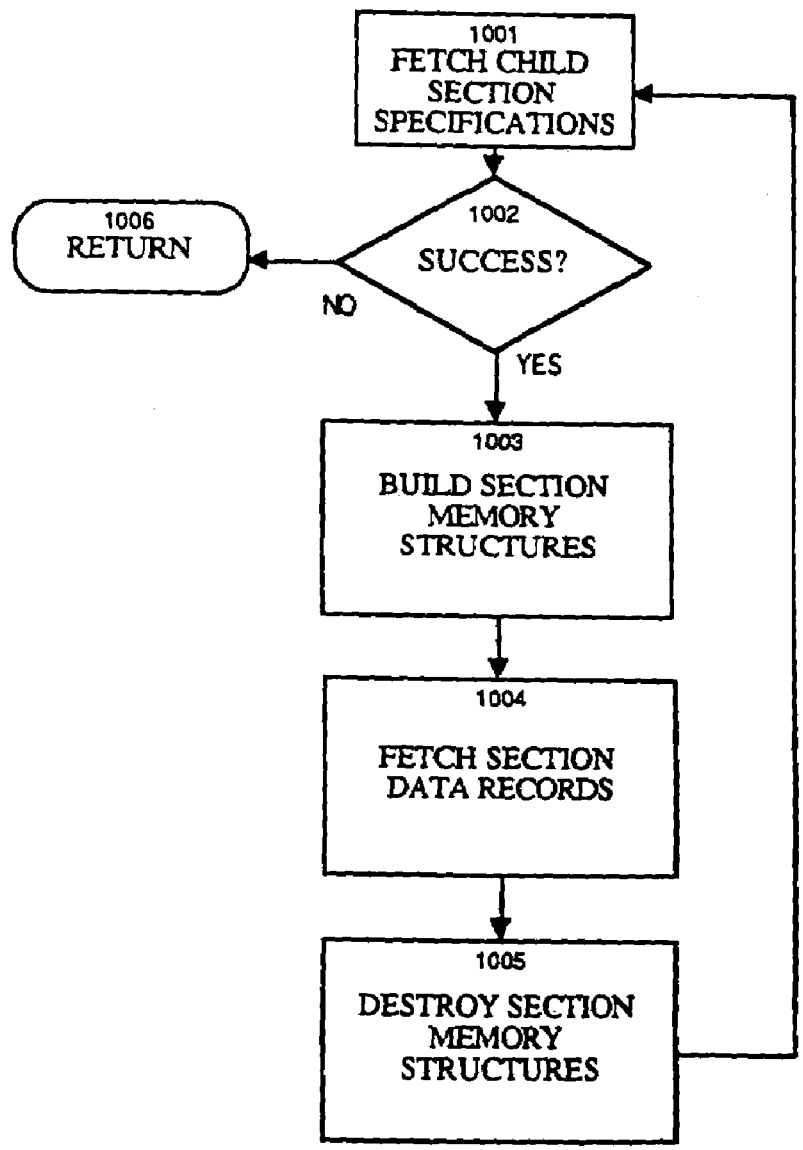
FIG. 10 is a flow diagram of the Process Child Sections subprocess shown in FIG. 7.

Referring now to FIG. 10, there is shown a flow diagram of the process child sections subprocess 708. Processing commences by fetching 1001 a child section specification for the current parent section. As described above, child sections may represent a level break header or footer section, or they may represent detail information A check is then made 1002 to determine whether specifications were indeed retrieved. If not, processing returns 1006 to the calling process. Otherwise the memory structures for information about the child section are constructed 1003 and populated according to the specifications. This information includes section-wide information such as text font and color, and numerical scaling factors, if different from that specified for the report or superordinate sections. Every object in the section is also constructed in memory, and database request strings are constructed for data selection and sequencing. Event rules are also executed at this time if custom code has been provided for this event; otherwise a flag is set so that when this event occurs again no search will be made for such non-existent custom code. Next, section data records are fetched 1004 as described above in connection with FIG. 6 to retrieve and print data for the child section. Since this child section could itself have child sections, data level breaks could occur in connection with processing of this child section that would cause recursive child section processing for such subordinate child sections. Processing for a parent section is suspended while processing for subordinate child sections takes place.

When all data have been processed for the current section, the memory structures for the section are destroyed 1005. Event rules for the current section are executed prior to destroying the data structures if there is custom code for the event, and if not a flag is set so that when this event occurs again no search will be made for such non-existent custom code. A new child section specification is then fetched 1001, and processing continues as previously described.

Figure 12:
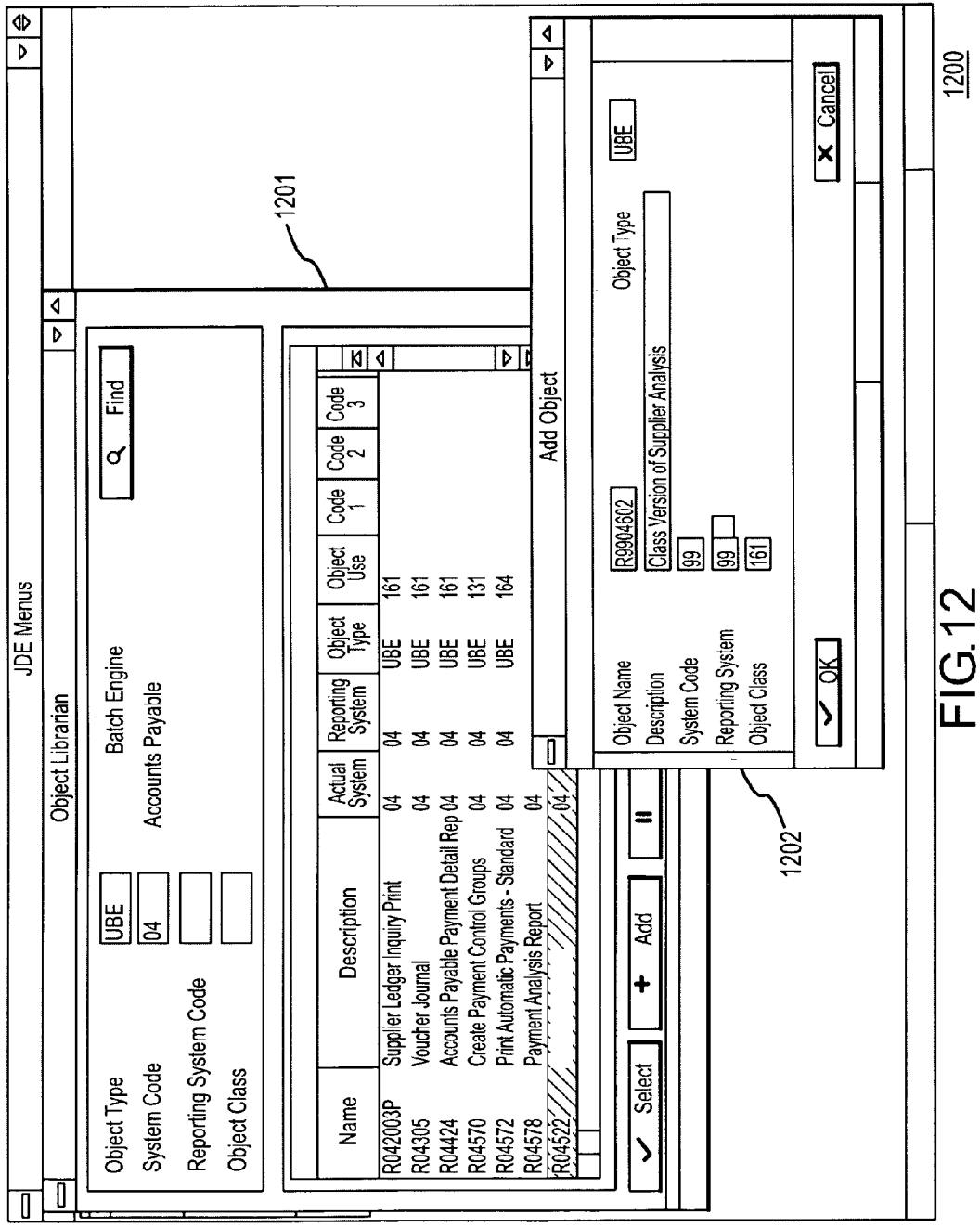
FIG. 12 illustrates a user interface object librarian dialog screen for adding a new object.

FIGS. 12 though 41 illustrate user interface screens that are displayed on a user's computer, e.g., client computer 111, in connection with operation of system 100.

Referring now to FIG. 12, there is shown an object librarian user interface screen 1200 illustrating how a new report is added using system 100. An object librarian window 1201 displays to a user of a client computer, e.g., 111, a list of previously made report templates. Screen 1200 permits specification of an object type, for example "UBE" for universal batch engine indicating that the object is a report template for use with batch processing engine 200. Other identifying information, such as system codes, object names, descriptions, use codes, and the like, are also provided. System 100 includes conventional search facilities to locate report templates based on searches for templates that match any of these criteria selected by the user.

Figure 13:
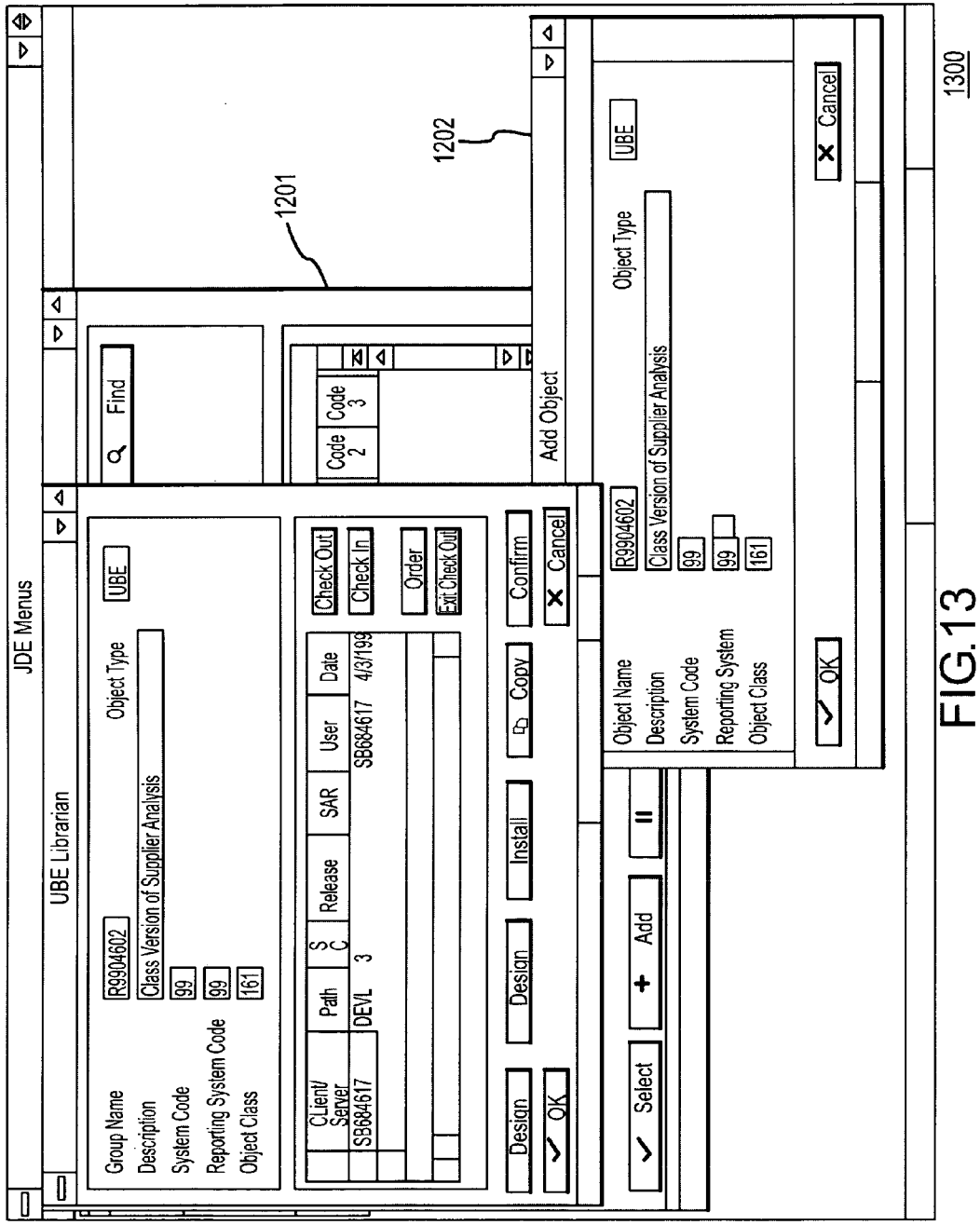
FIG. 13 illustrates a user interface batch engine librarian dialog screen for working with version and templates.

Referring now to FIG. 13, there is shown a user interface batch engine librarian dialog screen for working with versions and templates. In addition to windows 1201 and 1202 described above, screen 1300 includes a UBE librarian window 1301 for storing and retrieving templates. A new template is "checked in" using window 1301; checking in a template causes the specifications corresponding to the template to be stored on specification server 126. Existing templates are "checked out" using window 1301; checking out a template causes a copy of it to be retrieved from specification server 126. Window 1301 also includes a button labeled "Design" that commences operation of design tool subsystem 210 to allow the user to begin designing a new template or making changes to an existing template. A "Versions List" button brings the user to a window that allows the user to add or change report versions. A "Copy" button copies a highlighted template into a new template.

Figure 14:
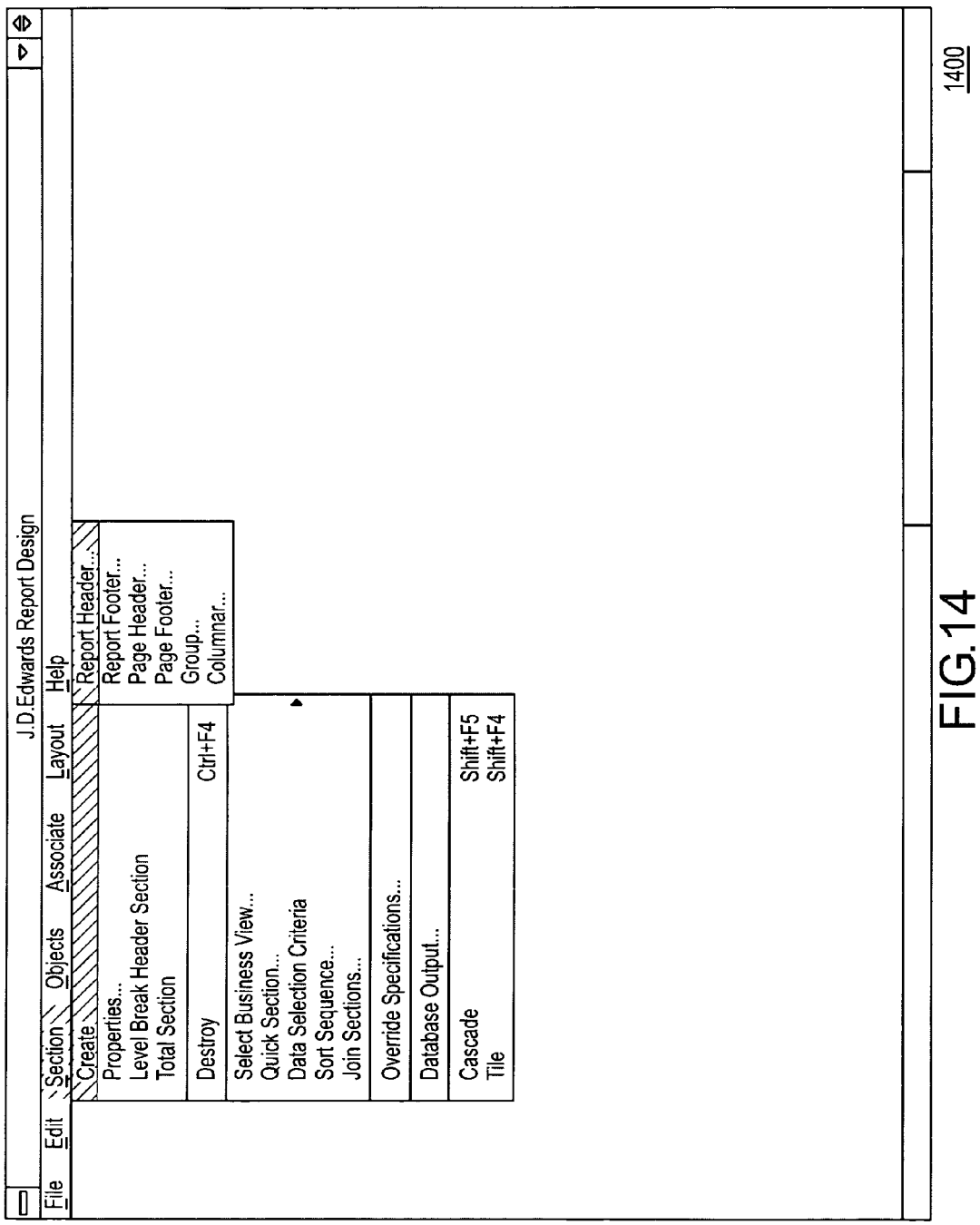
FIG. 14 illustrates a user interface pull-down menu screen for creating new sections.

Referring now to FIG. 14, there is shown a menu screen 1400 for creating sections. The highlighted "Create" selection brings up a submenu to allow creation of a report header that prints at the beginning of a report, a report footer that prints at the end of a report, a page header that prints at the top of every page, a page footer that prints at the bottom of every page, a group section in which fields can be arranged in any order and position, and a columnar section in-which fields are automatically arranged across the page with column headings at the top and detailed information below. Screen 1400 also permits the user to select properties of a section through a section properties screen, to connect level break objects through a Level Break Header Section selection, to connect level break or accumulated objects through a Total Section selection, to delete a section through the Destroy selection, to select a business view to associate with a section, to select fields from the business view and order them on the report through the Quick Section selection, to select Data Selection Criteria, to select a Sort Sequence, to joint a child to a parent section based on fields common to both sections using a join Sections selection, to selectively determine which parts of a template will be overridden in the version created from the template, and to permit file creation and update using a Database Output selection. Thus, various pieces of the template can be overridden at the section level, and each piece that the user wishes to override can be designation through section overrides.

Figure 15:
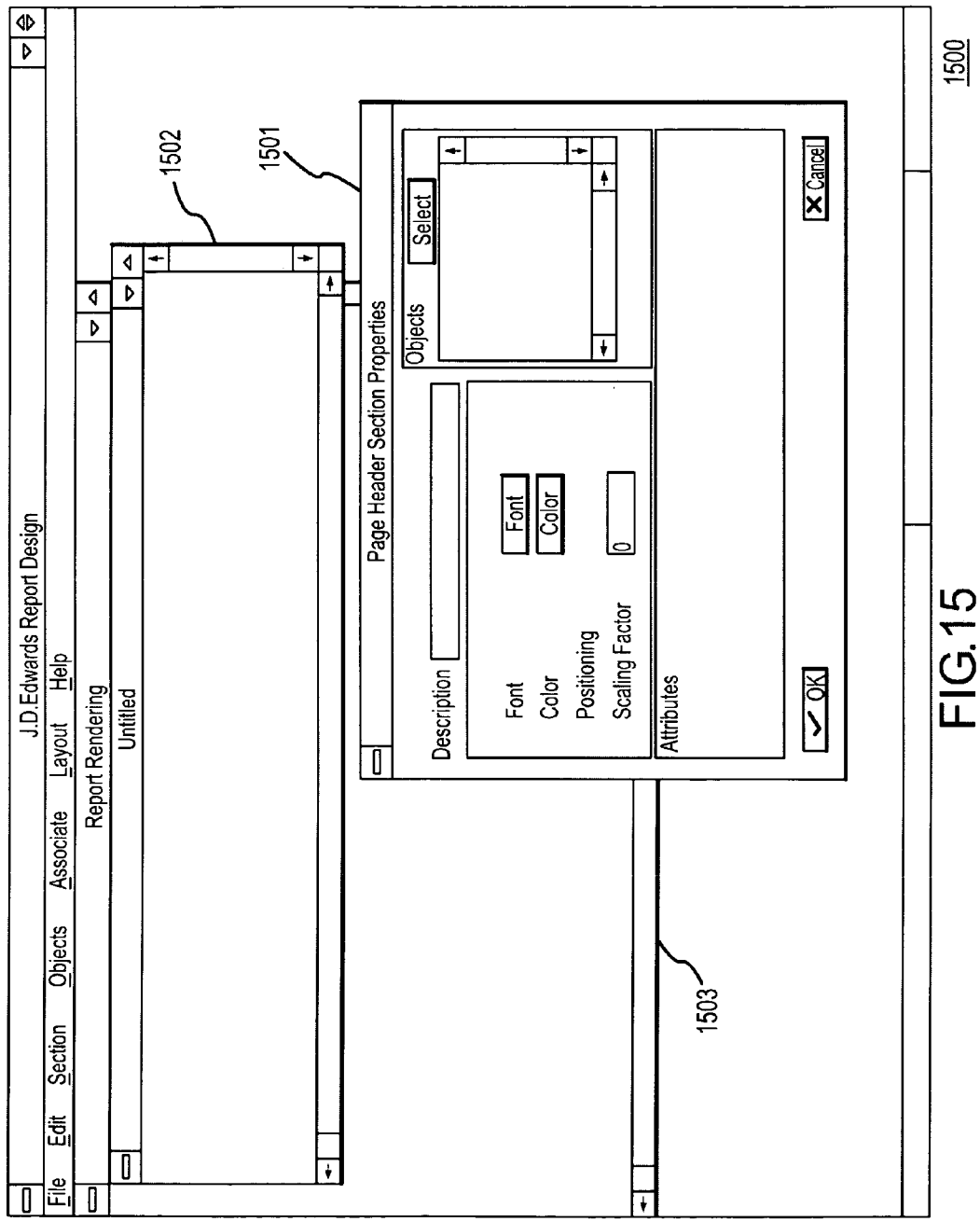
FIG. 15 illustrates a user interface screen for setting page header section properties.

Referring now to FIG. 15, there is shown a user interface screen 1500 for setting page header section properties. This screen allows section overrides and attributes to be set.

Window 1501 includes an objects box displaying objects or fields that the user has selected and allowing the user to get to an object properties screen for any particular object that is displayed. A "Description" area of window 1501 permits the user to type in a title to describe the function of this section, such as page header or report footer. Alternatively, if a business view is selected for the current section, the Description defaults to the name of the business view. An "Override" area of window 1501 allows the user to override the properties that have been set for the report so that different properties can be used for the current section. Properties that can be overridden are font, color, positioning and scaling factor. An "Attributes" area allows the user to indicate whether the section is a level break header section, a total or grand total section, whether the section will reprint on a page break, will cause a page break after it prints, will not have a page header, or will not be visible (but instead be used only for intermediate calculations). Screen 1500 also includes an untitled window 1502 that is used to show the contents of the current section and a report rendering window 1503 that is used to show the user what the report being designed will look like when it is printed.

Figure 16:
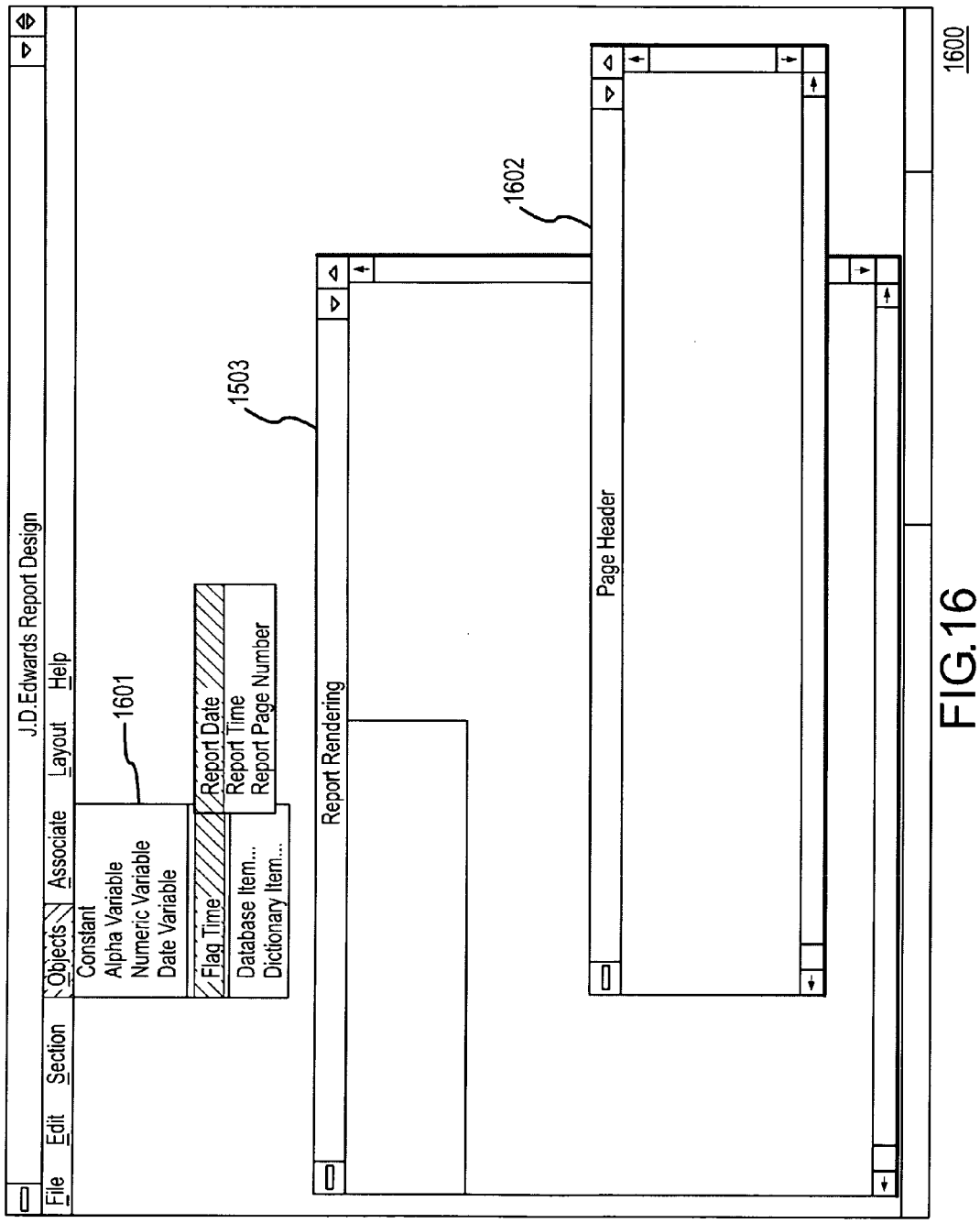
FIG. 16 illustrates a user interface screen for inserting objects into reports.

Referring now to FIG. 16, there is shown a user interface screen 1600 for inserting objects into reports. Screen 1600 includes a pull down menu 1601 allowing the user to select different types of objects for insertion into a report. A constant is an object that can be used to hold text that does not change; an alpha variable is an object used to hold alphanumeric information that may change based on fetched database information, a calculation, or event rules that assign a value to it; a numeric variable is an object used to hold numbers; and a date variable is an object used to hold dates. A Run Time selection permits the user to add Report Date, Report Time, and Report Page Number objects. Database Item and. Dictionary Item selections allow corresponding items to be inserted into a section. Screen 1600 as shown on FIG. 16 includes a page header window 1602, indicating that the current section for which objects are to be inserted is a page header section and showing the contents of that section. Screen 1600 further includes report rendering window 1503 as discussed above.

Figure 17:
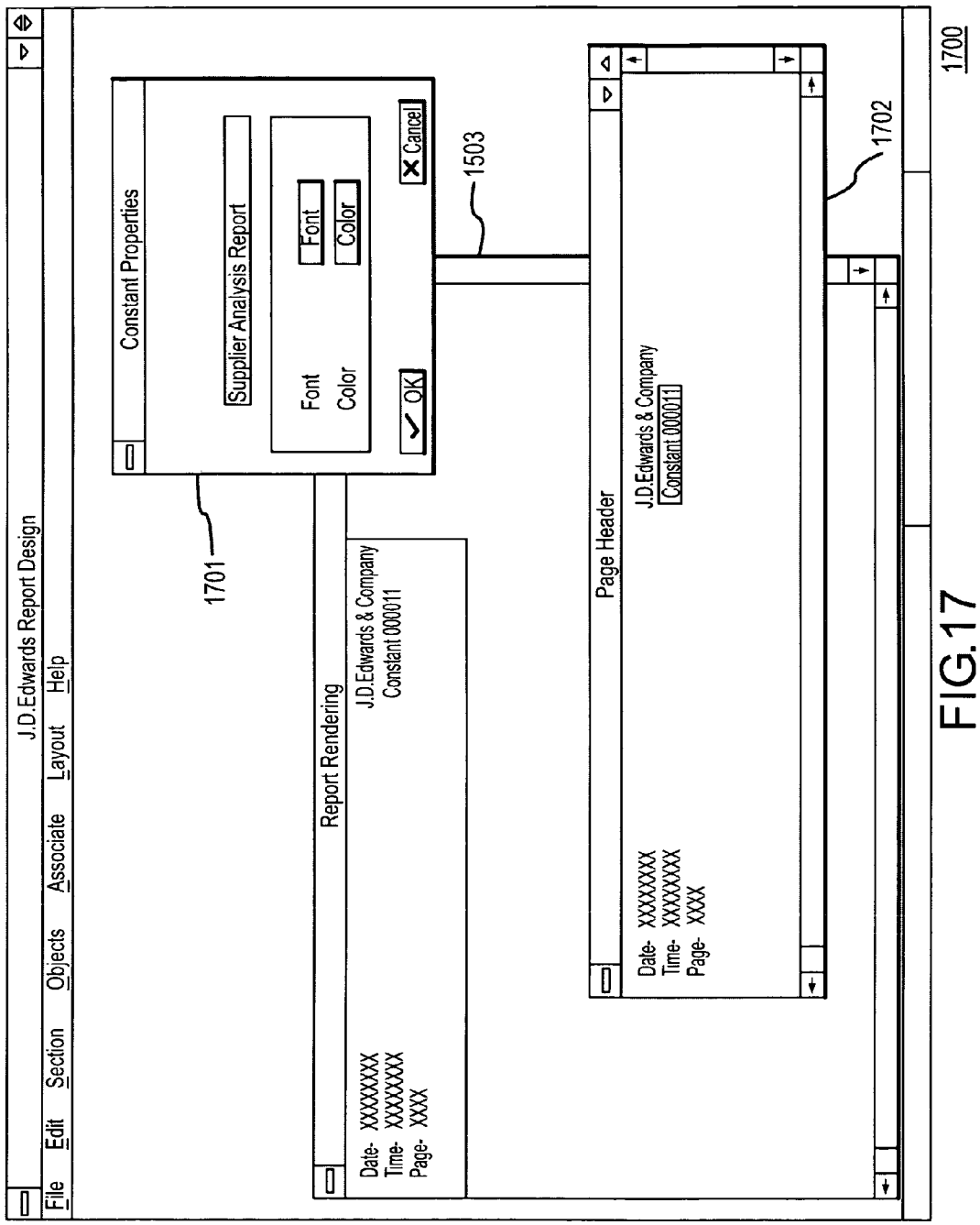
FIG. 17 a user interface screen for setting properties for constants.

Referring now to FIG. 17, there is shown a user interface screen for setting properties for constants. Screen 1700 includes a constant properties window 1701 allowing a user to define properties for each constant object that is to be used in a report. These properties are a tide and overrides for the font and color for the constant object. Screen 1700 further includes a page header window 1702 showing the contents of the current section, including the selected constant object. Screen 1700 also includes report rendering window 1503 as previously discussed.

Figure 18:
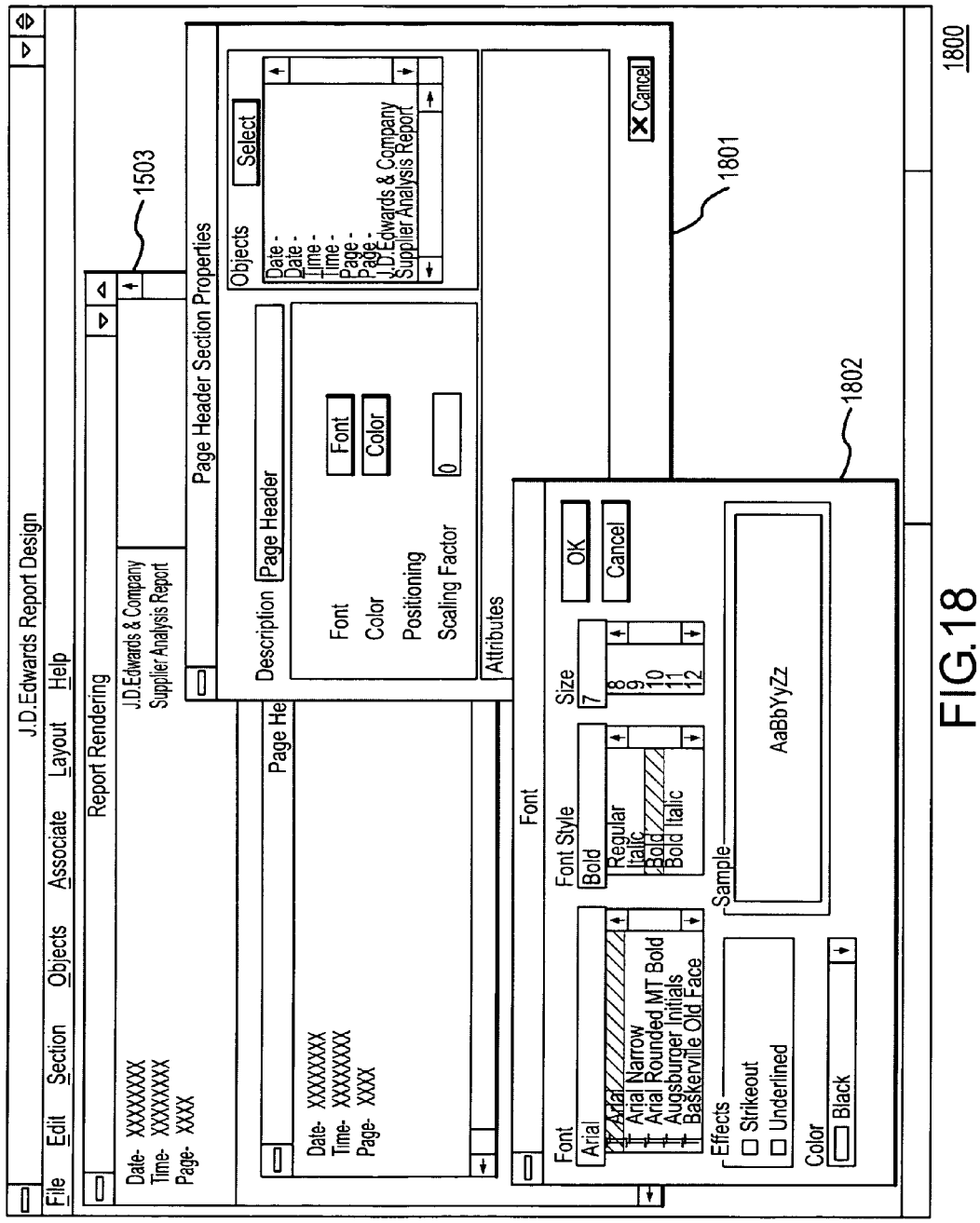
FIG. 18 is a user interface screen for setting properties for sections.

Referring now to FIG. 18, there is shown a user interface screen 1800 for setting properties for sections. Screen 1800 includes a page header section properties window 1801 permitting the user to select one or more objects of a particular section and redefine properties of those objects, such as font, as previously discussed. In the example illustrated in screen 1800, the user has selected to override the original font properties for the report by clicking on a "Font" button, which has resulted in font window 1802 being displayed. Window 1802 permits text font, style, size, color, and effects (i.e., strikeout, underline) to be set, and displays a sample of text with the selected properties. Screen 1800 also includes a report rendering window 1503 and a page header window 1702 as previously discussed.

Figure 19:
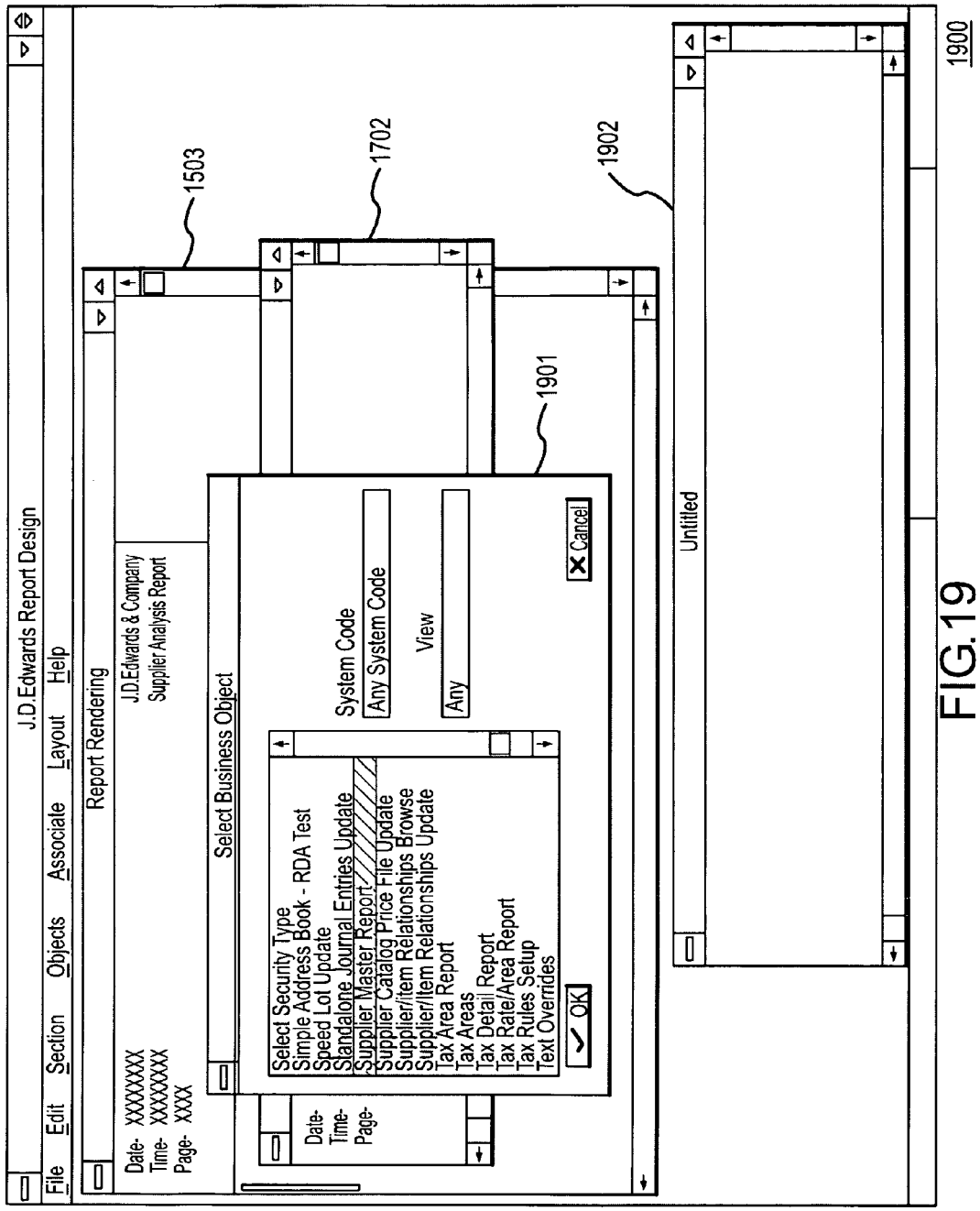
FIG. 19 is a user interface screen for selecting business views.

Referring now to FIG. 19, there is shown a user interface screen 1900 for selecting business views. Screen 1900 includes a select business object window 1901 that permits the user to populate a section with information from a specific table by associating a business view with that section. Window 1901 includes a list of available business views, which may be limited by the user entering a particular system code or business view code. For instance, a business view code of "400" is used in system 100 to indicate business views that are of particular relevance to reports, as opposed to having different primary uses. Available business views may include joined business views in which two or more files have been linked together to access fields from the joined files. Untitled window 1902 displays the contents of the selected section, and the title of this window changes to the name of the business view as soon as one of the listed business view objects in window 1901 is selected. Screen 1900 also includes the page header and report rendering windows 1702, 1503 previously discussed.

Figure 20:
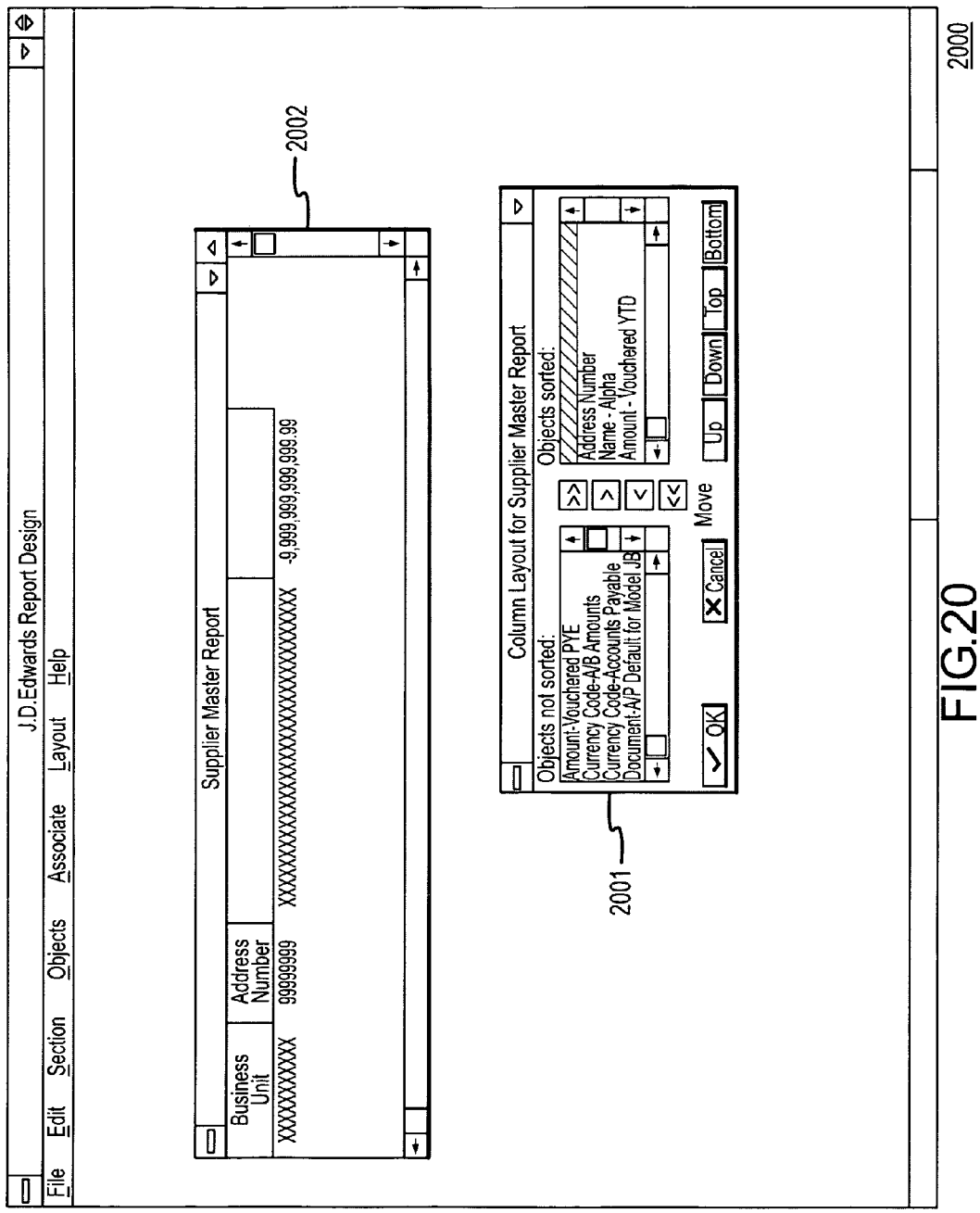
FIG. 20 is a user interface screen for quick section selection.

Referring now to FIG. 20, there is shown a user interface screen 2000 for quick section selection. Screen 2000 includes a column layout for supplier master report window 2001 and a supplied master report window 2002. Selection of Quick Section from the menu on screen 1400 of FIG. 14 results in display of window 2001 to allow the user to select which columns or fields will appear on the report. The window is entitled "Column Layout . . . " for columnar sections, "Quick Section Layout . . . " for group sections, and "Data Dictionary for Quick Section Layout . . . " if no business view has been associated with the section. Window 2001 includes a "Columns not in row" area and a "Columns in row" area. The former lists the various database items that are available from the business view attached to the section; the latter lists columns that the user has selected from the former to appear in the report. Once columns have been selected to appear in the report, the window also allows the user to arrange the listed columns in the order that they are to appear. An "OK" button on window 2001 is used to populate the current section with the selected columns. Window 2002 displays the layout that has been selected by the user.

Figure 21:
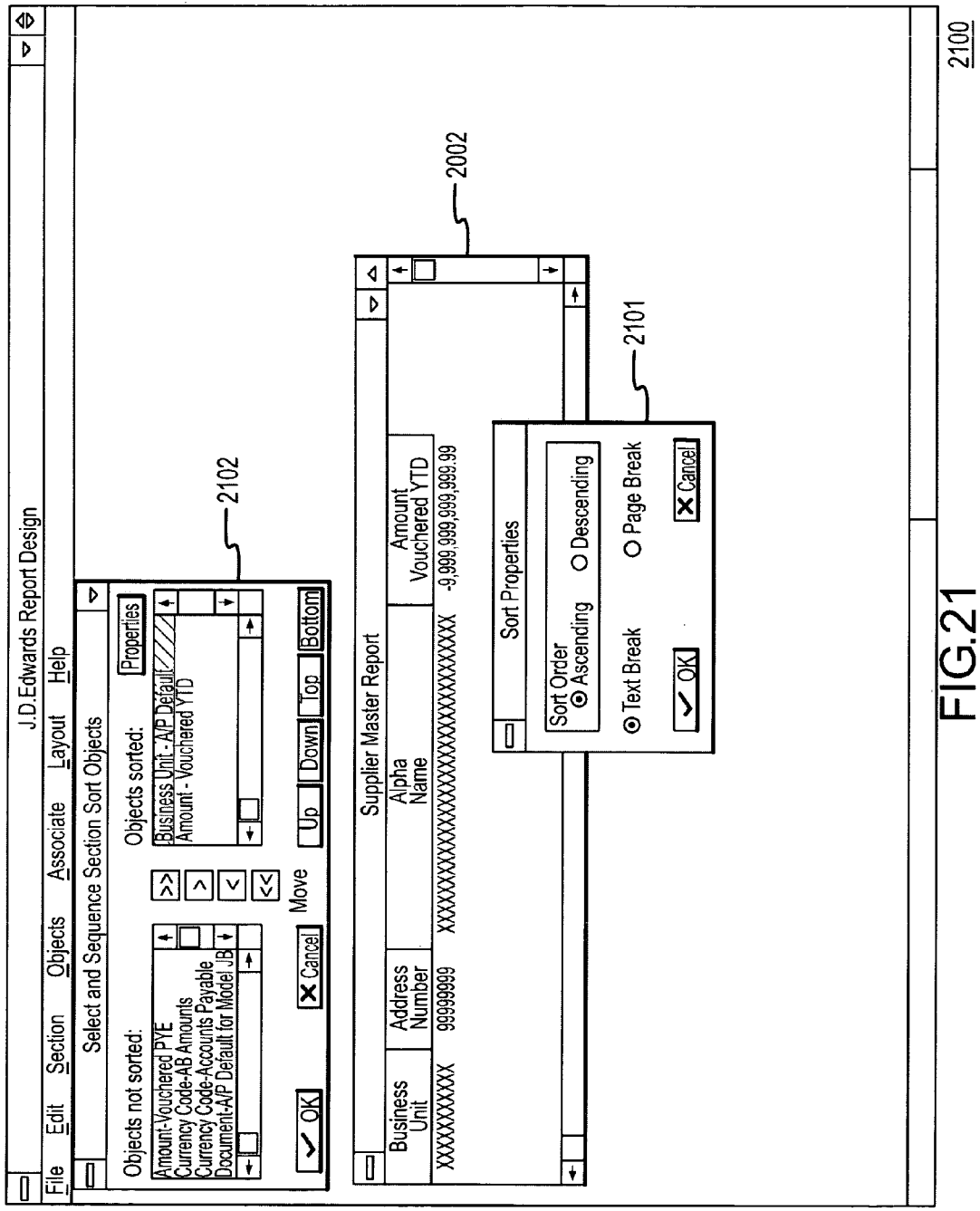
FIG. 21 is a user interface screen for selecting and sequencing section sort objects.
Figure 22:
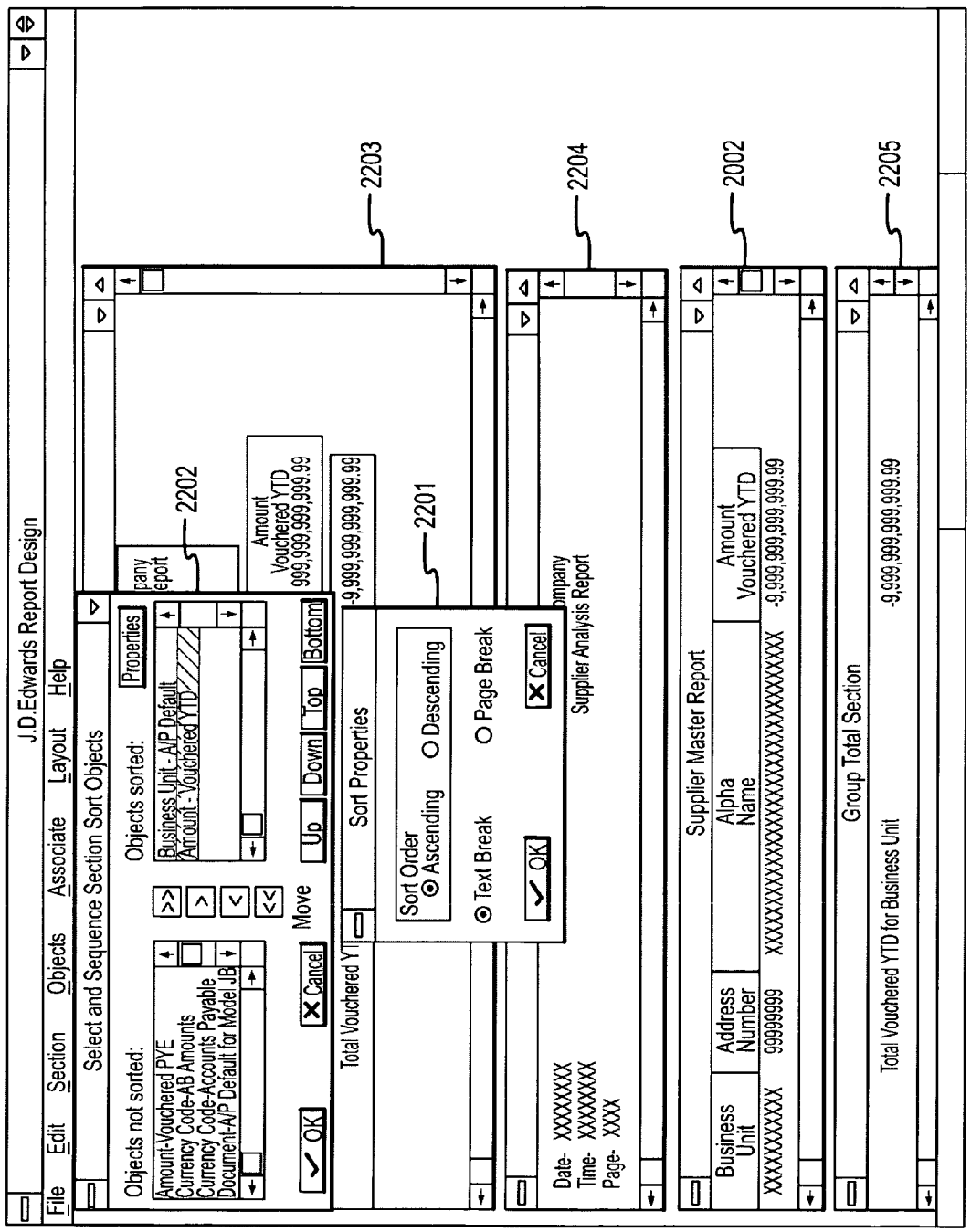
FIG. 22 is another user interface screen for selecting and sequencing section sort objects.

Referring now to FIGS. 21 and 22, there are shown a user interface screens 2100,2200 for selecting and sequencing section sort objects. Screen 2100 is displayed when a user activates the "close" button on window 2001 of FIG. 20, and allows the user to indicate which columns or fields are to be used for sorting in the current section. A select and sequence section sort objects window 2102 allows the user to choose and order objects to be sorted from a list of objects not sorted, using the same mechanism as described in connection with window 2001. In addition, window 2102 includes a "Properties" button which, when selected after highlighting an object in the list of objects to be sorted, causes a sort properties window 2101 to be displayed. Window 2101 allows the user to select an ascending or descending sort order, and to select whether the current object is to be used as a level break indicator. As discussed previously, sections can be joined at a level break, totals can be evaluated at a level break, and level break header sections can be triggered at a level break. Window 2101 also allows the user to select whether the current object is to be used as a page break indicator. Screen 2100 also includes supplier master report window 2002 as previously discussed.

Whereas screen 2100 of FIG. 21 illustrates sort properties for a Business Unit that is a level break data item sorted in ascending order, screen 2200 illustrates sort properties for a YTD Vouchered Amount that is not a level break item and that is sorted in descending order. Specifically, in FIG. 21, window 2102 shows the selection of "Business Unit", and window 2101 shows indicates both an ascending sort order and a level break. In FIG. 22, window 2202 shows the selection of YTD Vouchered Amount, and window 2201 shows a descending sort order and no level break.

Figure 23:
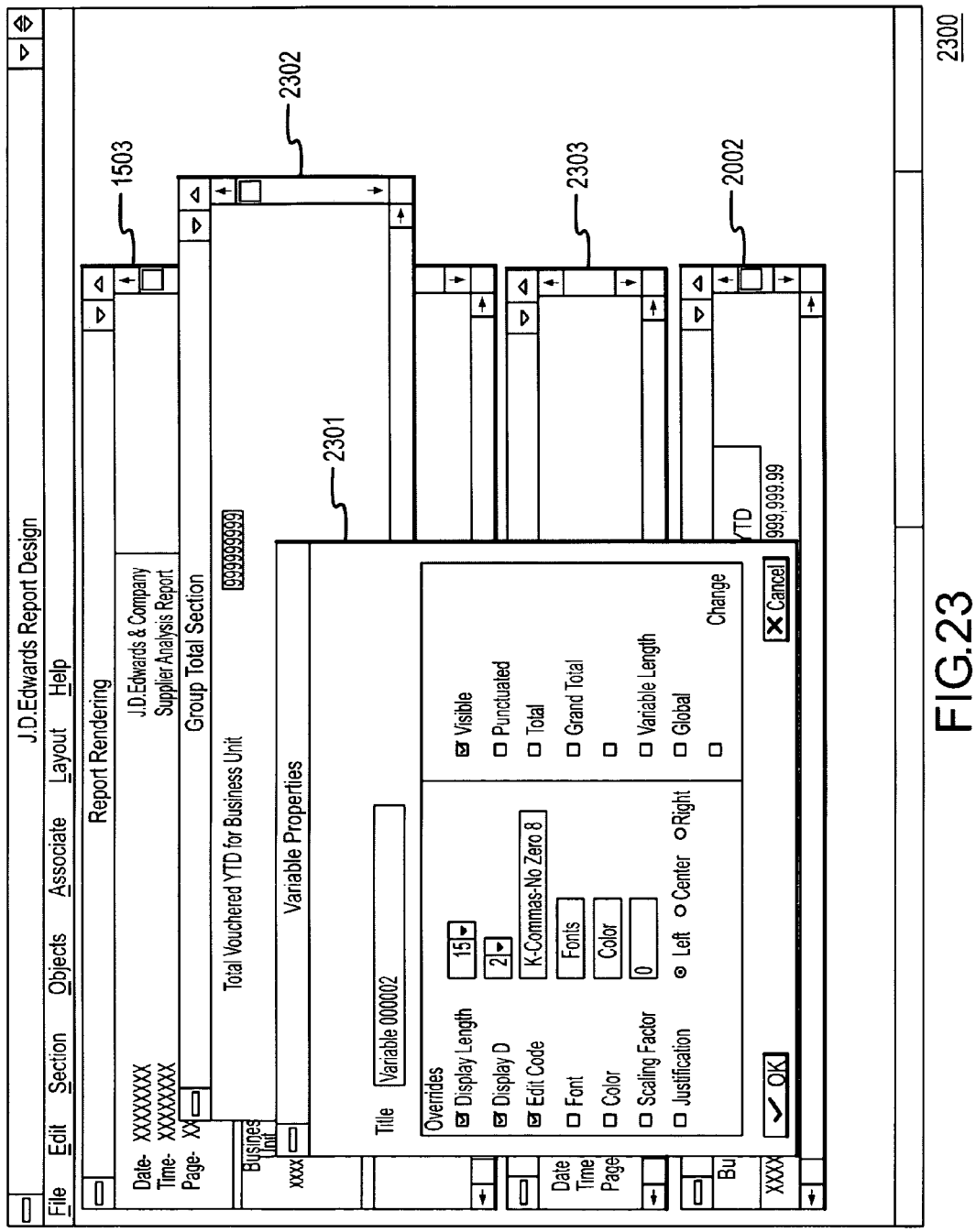
FIG. 23 is a user interface screen for group section and variable properties.

Referring now to FIG. 23, there is shown a user interface screen 2300 for group section and variable properties. Screen 2300 includes a variable properties window 2301 that is displayed when a user double-clicks on a variable object displayed in another window. Window 2301 lists the title of the variable, as well as its properties. These properties can be set or changed by the user through window 2301. For example, window 2301 shows a variable object with a display length of 15 characters, two decimal places, and an edit code governing display characteristics. Font, color, scaling factor, and justification can also be over-ridden as previously described via this window. In addition, attributes can be set to determine whether the object is to be visible or hidden, whether it is to be the result of a calculation (i.e., "derived"), whether it is to be a total or a grand total, whether it is to be invisible on a line having totals, whether it is to be of variable length, whether it will only print when its value changes, and whether it is to be a global variable available for use in all sections. Screen 2300 also includes a group total section window 2302 that includes the variable object for which the user desired to view/set/change properties, and windows 1502, 2002, and 2204 as previously discussed.

Figure 24:
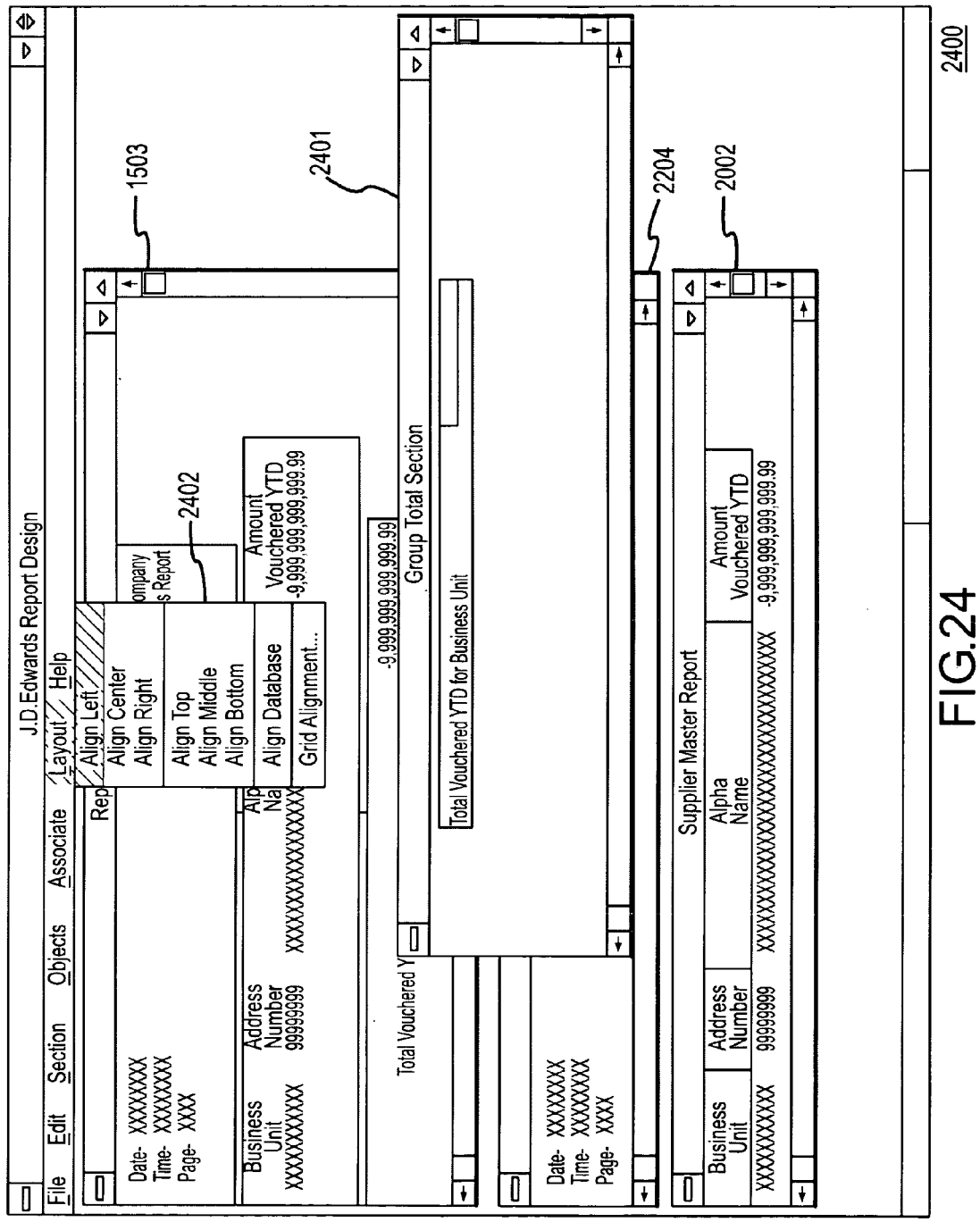
FIG. 24 is a user interface screen for aligning objects.

Referring now to FIG. 24, there is shown a user interface screen 2400 for aligning objects. When database items are placed in a section, they include two objects: a label that is a constant object type and a variable portion that holds the database value, e.g.,

| Company Name | xxxxxxxxxxxxxxxxxxxxxxxxxxxxxxxxxxx | where Company Name is the label and the x's represent a 30 character alphanumeric variable that holds the name of the company from the database.

Screen 2400 includes a group total section window 2401 and a layout menu 2402. To align objects in a row or column, a user selects the objects needing alignment, for instance here by selecting items in group total section window 2401 for which alignment is desired, selecting a particular one of those to which the others will be aligned, and then using the layout menu 2402 to select the type of alignment desired, i.e., left, center, right, top, middle, bottom. The "align database" menu selection aligns a series of the object pairs such as shown above that are placed vertically. For example, the following database items may initially be placed in a section:

| Company Number | xxxx |
| Company Name | xxxxxxxxxxxxxxxxxxxxxxxxxxxxxxxxx |
| Cost Center Number | xxxxxxxxxxxxx |
| Cost Center Description | xxxxxxxxxxxxxxxxxxxxxxxxxxxxxxxxx |

By drawing a rectangle around these items to group them together, and then selecting the constant company Number as the point of reference for aligning the other object, the Align database menu selection from menu 2402 provides the following results

| Company Number | xxxx |
| Company Name | xxxxxxxxxxxxxxxxxxxxxxxxxxxxxxxxx |
| Cost Center Number | xxxxxxxxxxxxx |
| Cost Center Description | xxxxxxxxxxxxxxxxxxxxxxxxxxxxxxxxx |

Similarly, the "grid alignment" selection of menu 2402 sets a grid to which objects may be "snapped" when the user initially designs a report.

Figure 25:
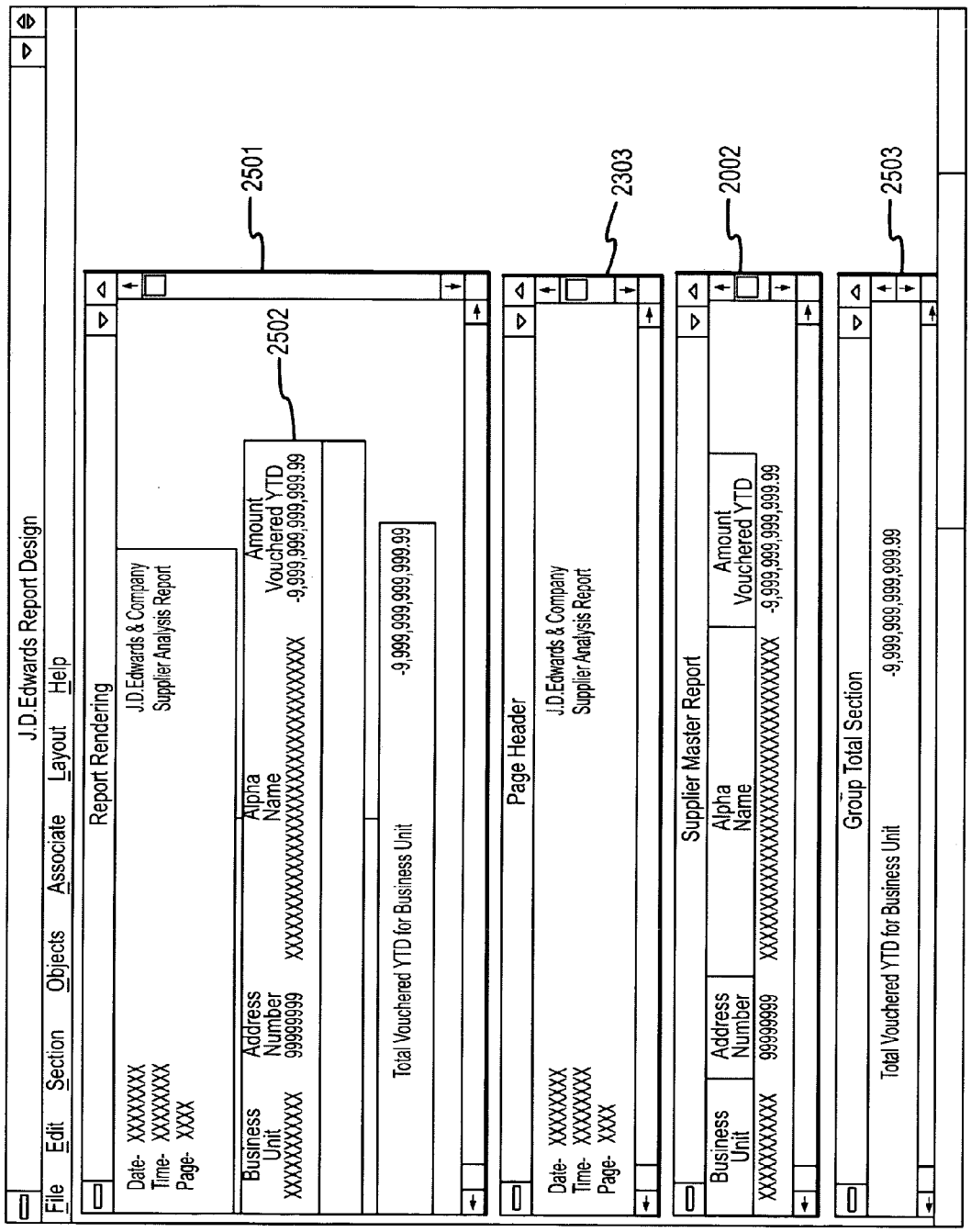
FIG. 25 is a user interface screen for report rendering.

Referring now to FIG. 25, there is shown a user interface screen 2500 for report rendering. Screen 2500 includes a report rendering window 2501 that provides a user with an indication of what the report currently being designed will look like when it is printed. Window 2501 is similar to window 1503 previously shown, but in addition includes a portion 2502 that is highlighted, indicating that the highlighted section is currently being worked on by the user. In this example, highlighting of cells in supplier master report window 2002 labeled "Business Unit", "Address Number", "Alpha Name", and "Amount Vouchered YTD" indicate that this window is currently being worked on by the user, and the portion 2502 of window 2501 corresponding to window 2002 is therefore highlighted by small squares. Where report rendering window 2501 is displayed for a report having a new section with no "components yet, the section is indicated by a small box at the left side of the report rendering window 2501. Screen 2500 also includes windows 2303 and 2503 for the other sections illustrated in report rendering window 2501.

Figure 26:
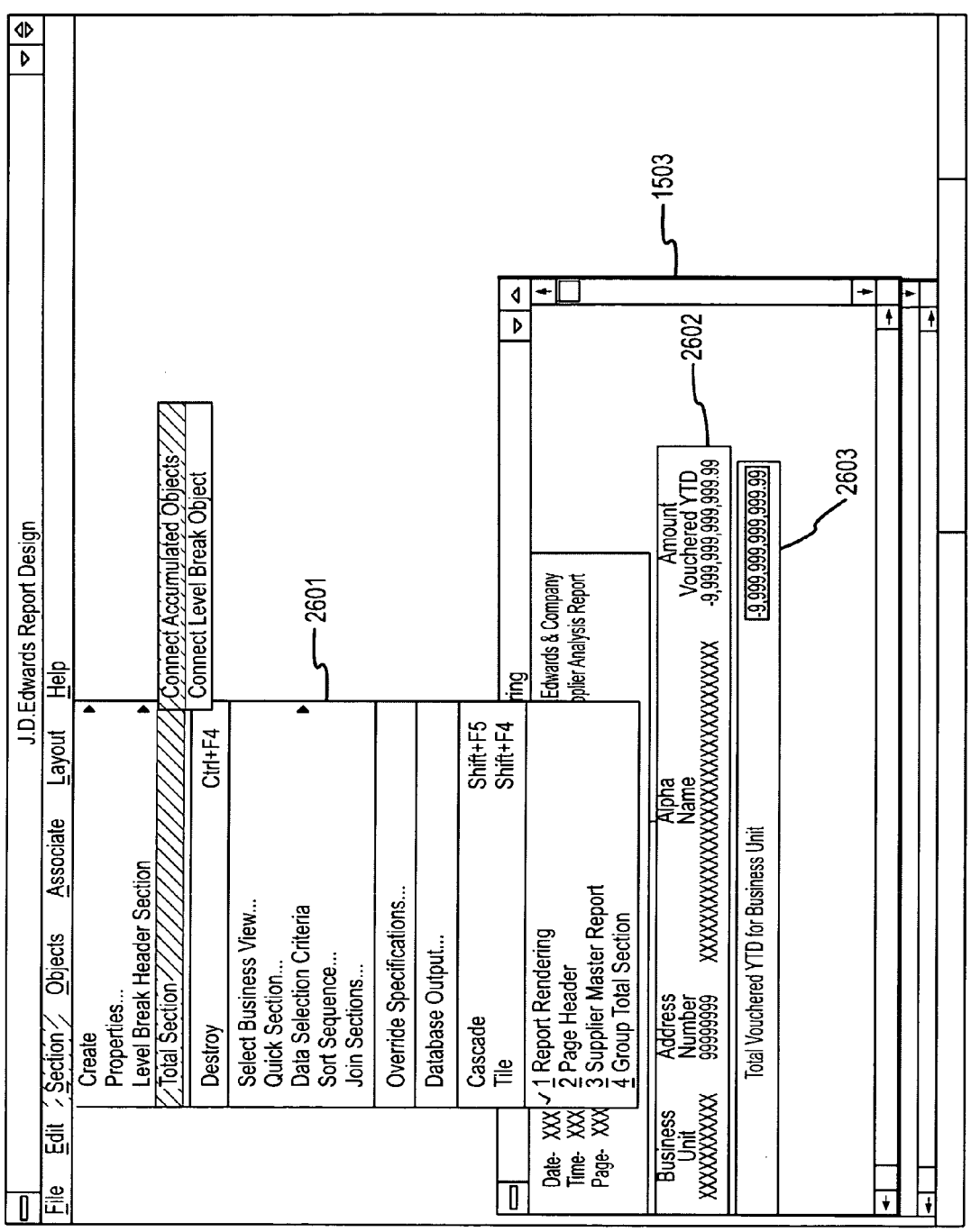
FIG. 26 is a user interface screen for connecting accumulated objects.

Referring now to FIG. 26, there is shown a user interface screen 2600 for determining which objects in a main section are to be accumulated into which objects in a total section. Screen 2600 includes report rendering window 1503 and a section menu 2601. To connect sections at a level break, as exemplified in FIG. 26 a user highlights an object in a total section representing an amount being totaled, as indicated by the box 2603(?) surrounding the value in window 1503. The user then selects the section menu 2601 and the total section choice provided by menu 2601, which permits a connect accumulated object choice and a connect level break object choice. The user then selects the accumulated object choice, and after that selects in report rendering window 1503 the object(s) that the user wants totaled, in this case the object 2602. In a preferred embodiment, object 2602 is then displayed in a red box to indicate that it is connected to object 2603.

Figure 27:
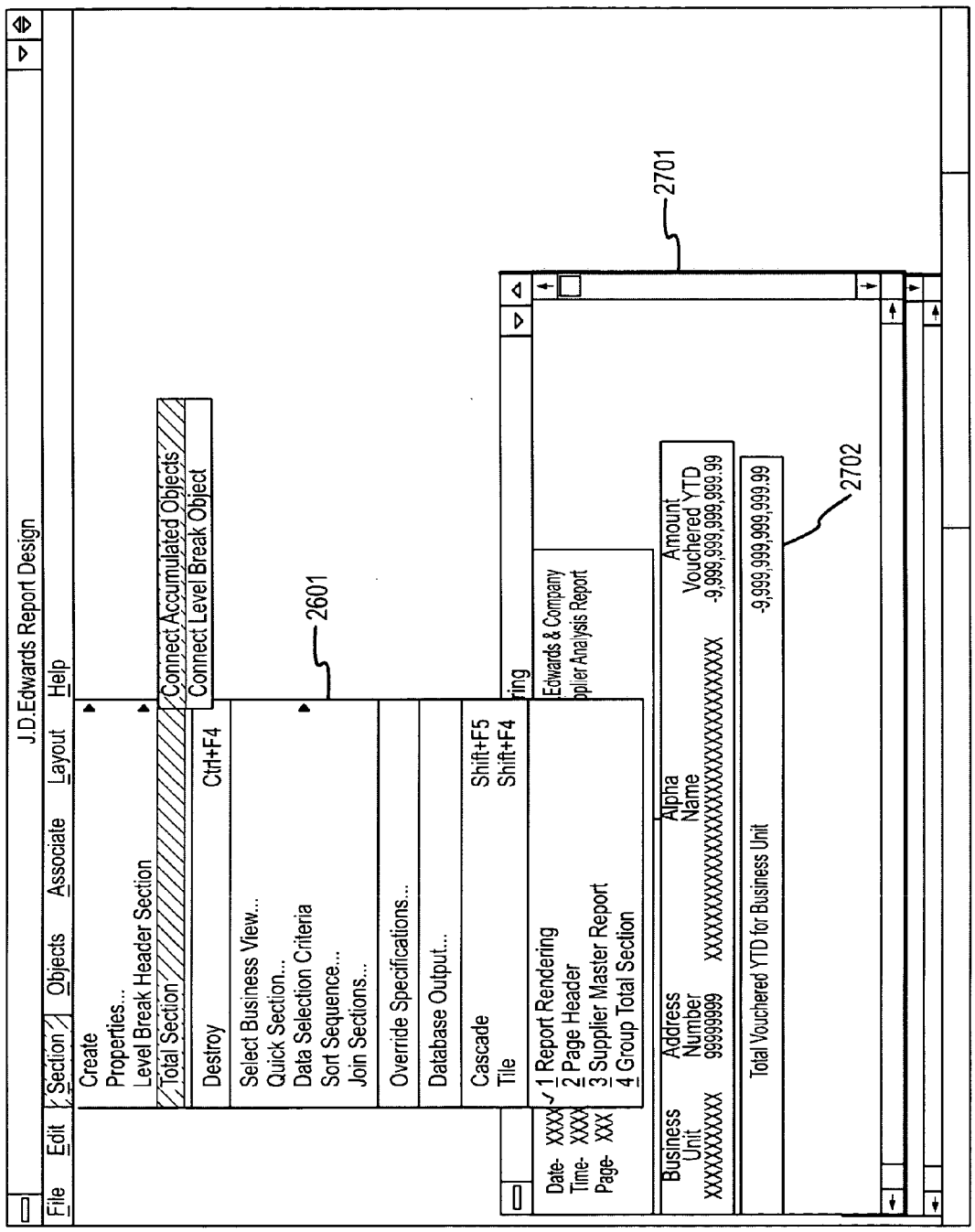
FIG. 27 is a user interface screen for connecting level break objects.

Referring now to FIG. 27, there is shown a user interface screen 2700 for connecting level break objects so as to determine which level break in a main section triggers the printing of a total section. Screen 2701 includes menu 2601 as previously described and report rendering window 2701. The user selects the total section 2702 which becomes highlighted as indicated by small squares, and then selects the connect level break object selection from menu 2601. The user then selects an object in the main section, for example Business Unit that has been designated for a level break. When the report executes, the total section will be produced whenever the value for the level break object changes.

Figure 28:
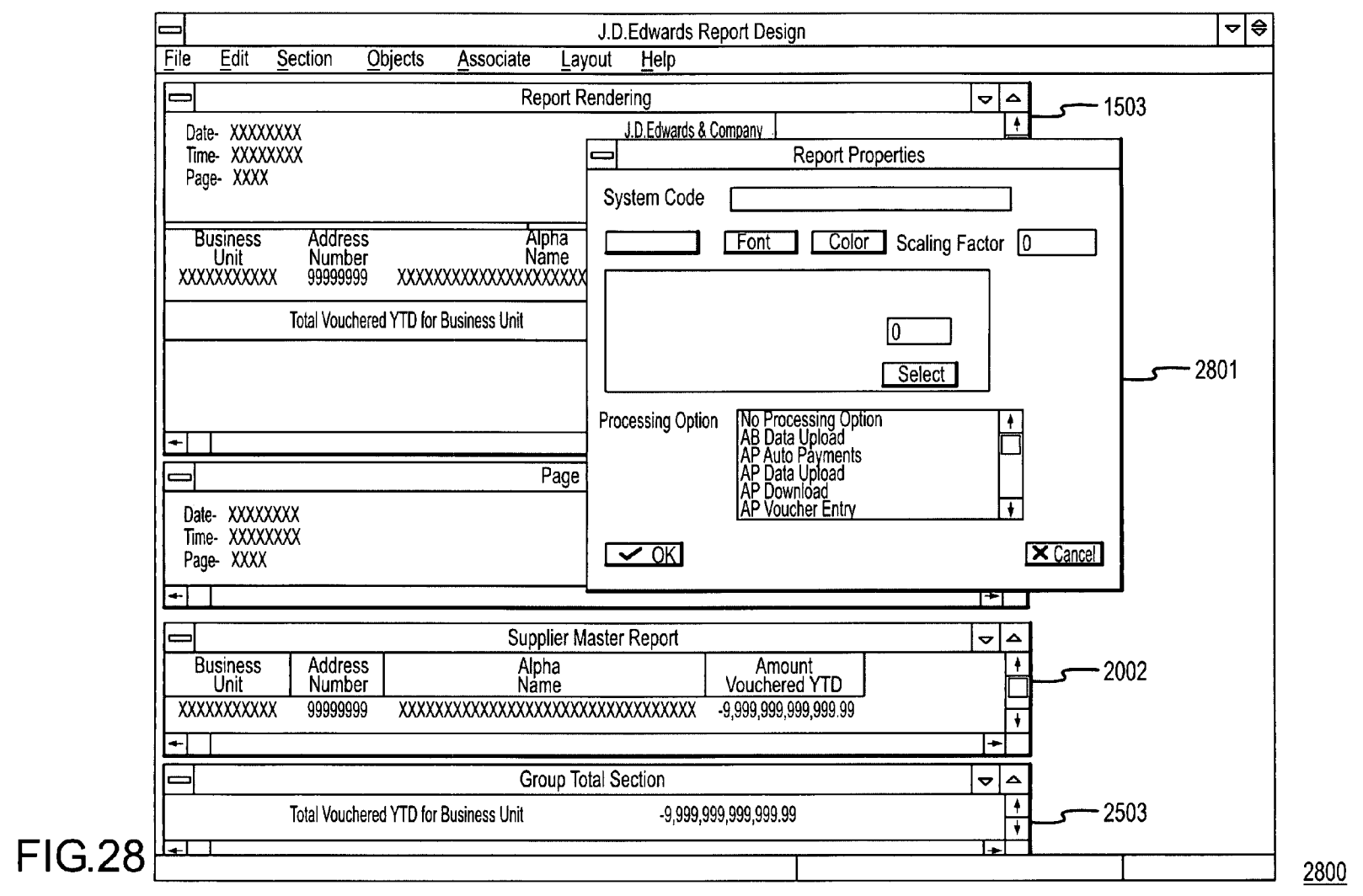

Referring now to FIG. 28, there is shown a user interface screen for report properties. Screen 2800 includes a report properties window 2801 and allows the user to set properties that will affect the entire report. Window 2801 permits the user to select text font, style and size; to have text printed with underline or overstrike; to scale numeric values; to print totals only, to allow/suppress the printing of grand totals at the end of the report; to limit the number of primary table rows so that only a few records rather than all records will print; to select special forms as desired; to set default printing options; and to select among a number of available processing options, which are presented in the form of a list in window 2801. Screen 2800 also includes windows 1503, 2002, and 2503 as previously discussed.

Figure 29:
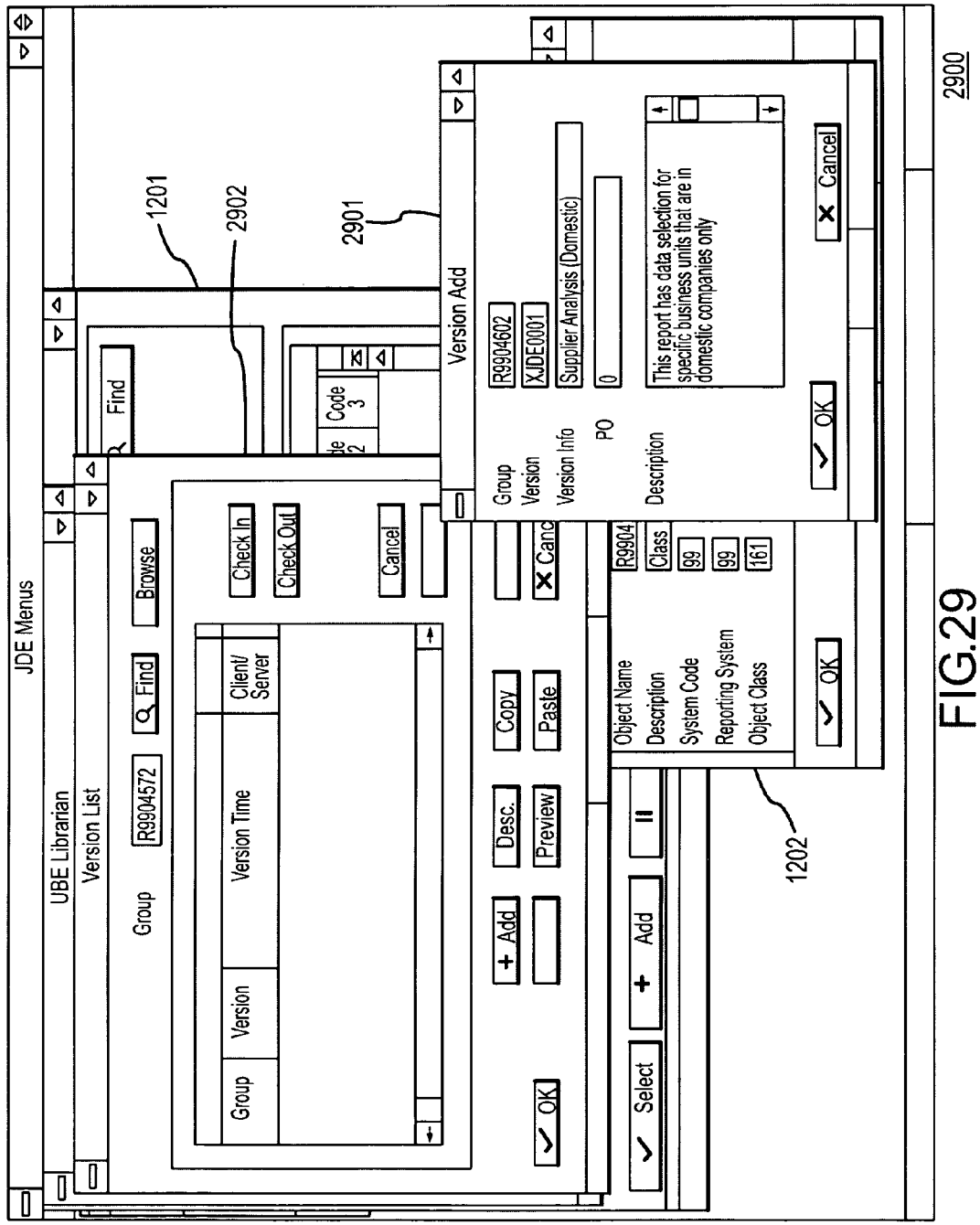
FIG. 29 is a user interface screen for adding a version.

Referring now to FIG. 29, there is shown a user interface screen 2900 for adding a version. Screen 2900 includes a version add window 2901 that permits a user to add a version of a template. The user selects a versions list button from UBE librarian window 1201 to cause a versions list window 2902 to be displayed. The versions list window 2902, as well as the version add window 2901, are displayed with the group name of the current template. Version add window 2901 provides areas for providing a version name, a version title, a number (either 1 or 0) to indicate whether processing options are to be displayed when the report is submitted, and description in free-form text to describe in greater detail the purpose of the report. Screen 2900 also includes previously discussed window 1202.

Figure 30:
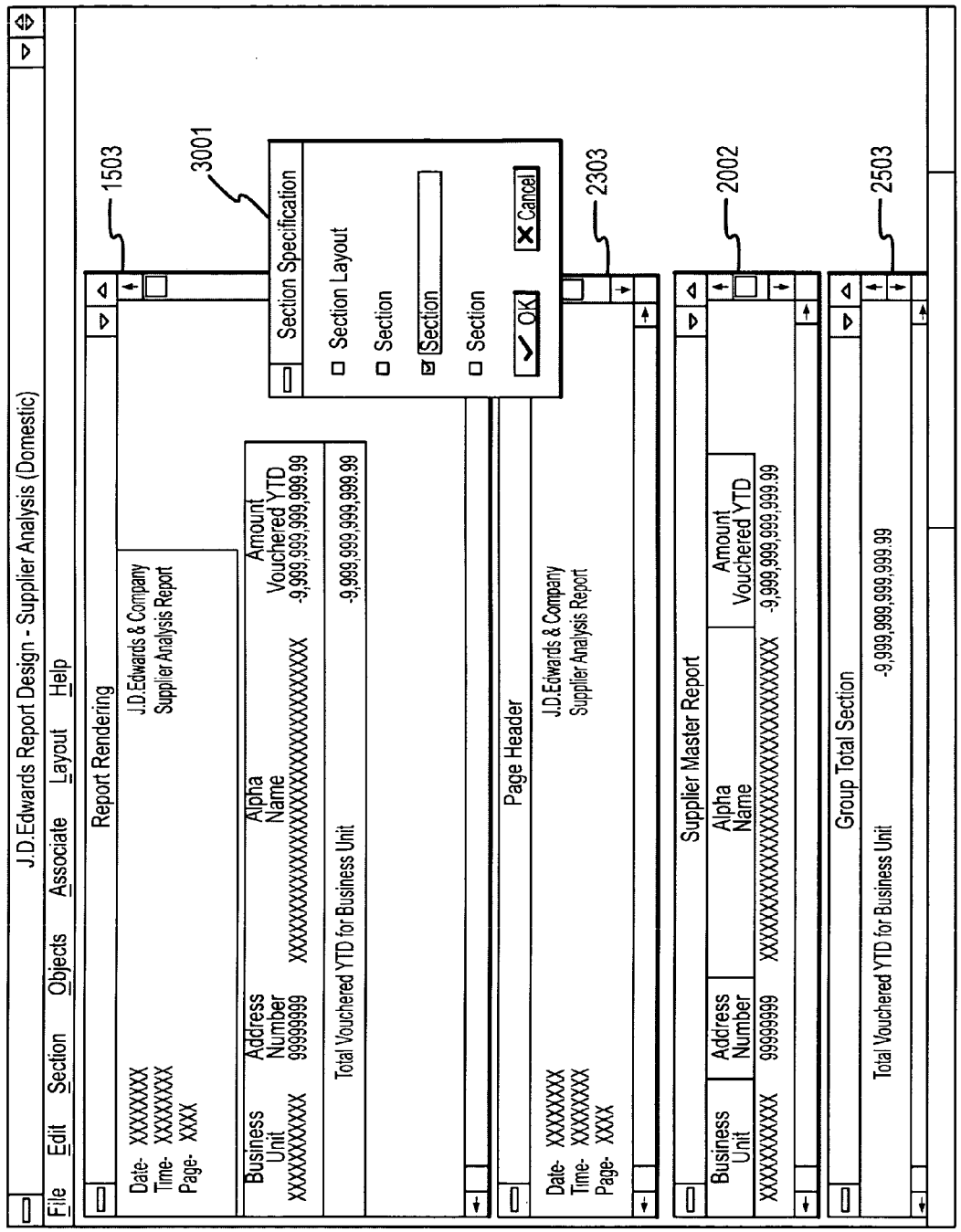
FIG. 30 is a user interface screen for version overrides.

Referring now to FIG. 30, there is shown a user interface screen 3000 for version overrides. Screen 3000 includes a section specification window 3001 that allows a user to select which specifications of a version the user wishes to override. A version is an exact copy of the template from which it was made, so such overrides allow a user to make slight changes as desired when working with versions. Section specification window 3001 allows the user to select section layout, if the user wishes to change the arrangement of objects in the section or add/delete objects. Section specification window 3001 also permits the user to make changes to the section sort and sequence, section data selection, and section database output as discussed above. Screen 3000 also includes previously discussed windows 1503, 2303, 2002, and 2503.

Figure 31:
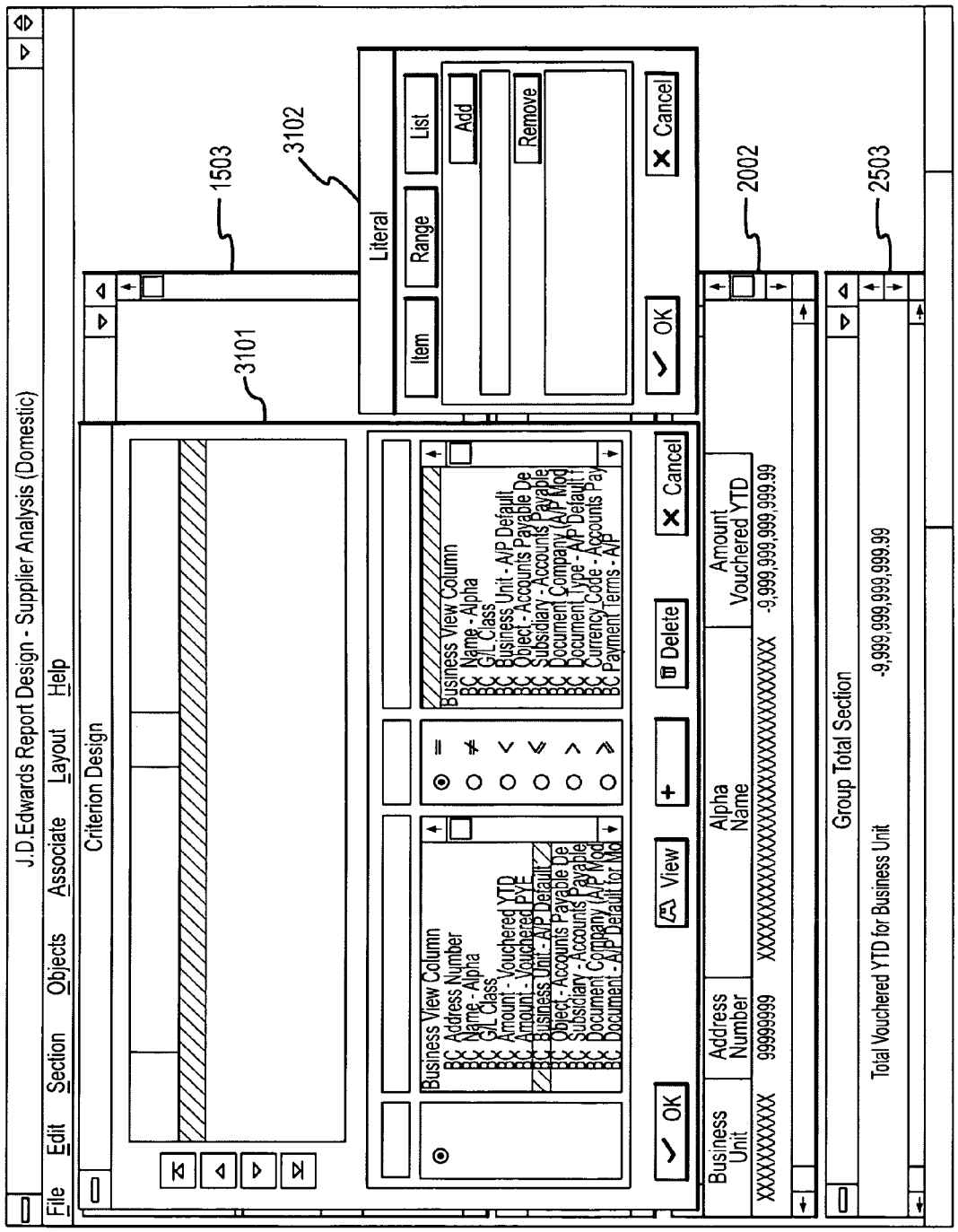
FIG. 31 is a user interface screen for data selection in a section.

Referring now to FIG. 31, there is shown a user interface screen 3100 for data selection in a section. Screen 3100 includes a criterion design window 3101 and a literal window 3102. To have data selection in a section, the user selects that section and selects a pull down menu choices for data selection and defining section criteria. Criterion design window 3101 presents the user with a number of items to select, such as "Amount–Vouchered YTD", a number of comparison operations, e.g., =or >, and a number of items against which the previously select item is to be compared. Alternatively, window 3102 allows the user to compare the previously selected item to a literal value provided by the user, a range of such values, or a list of such values. Thus, the user can use screen 3100 to direct the selection, for instance, of all entries having vouchered year-to-date amounts between 45,000 and 60,000. Screen 3100 also includes previously discussed windows 1503, 2002, and 2503.

Figure 32:
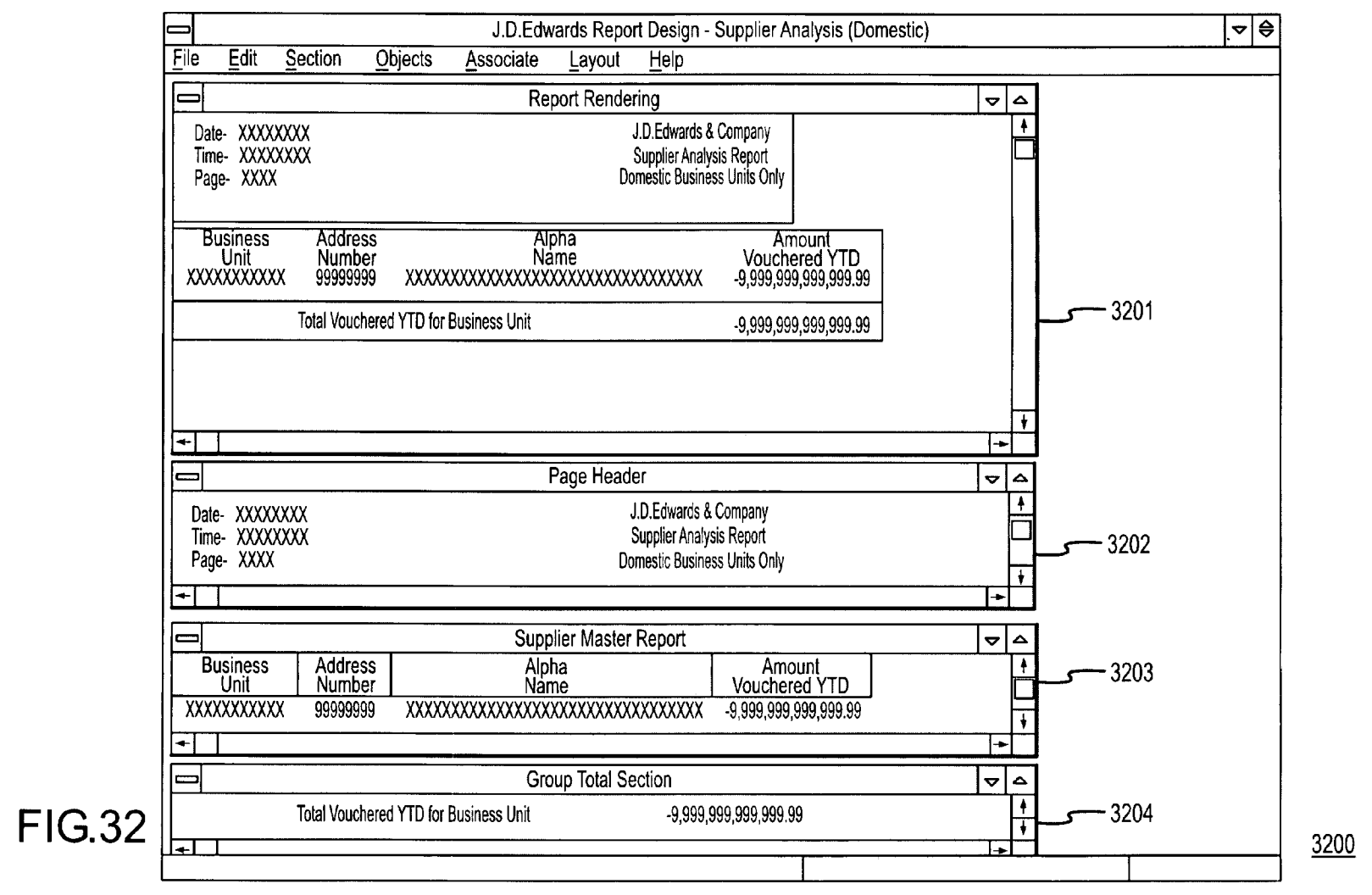

Referring now to FIG. 32, there is shown a completed report design. All three sections of the report are shown in a report rendering window 3201 at the top of the design, followed by individual windows 3202–3204 for each section.

Figure 33:
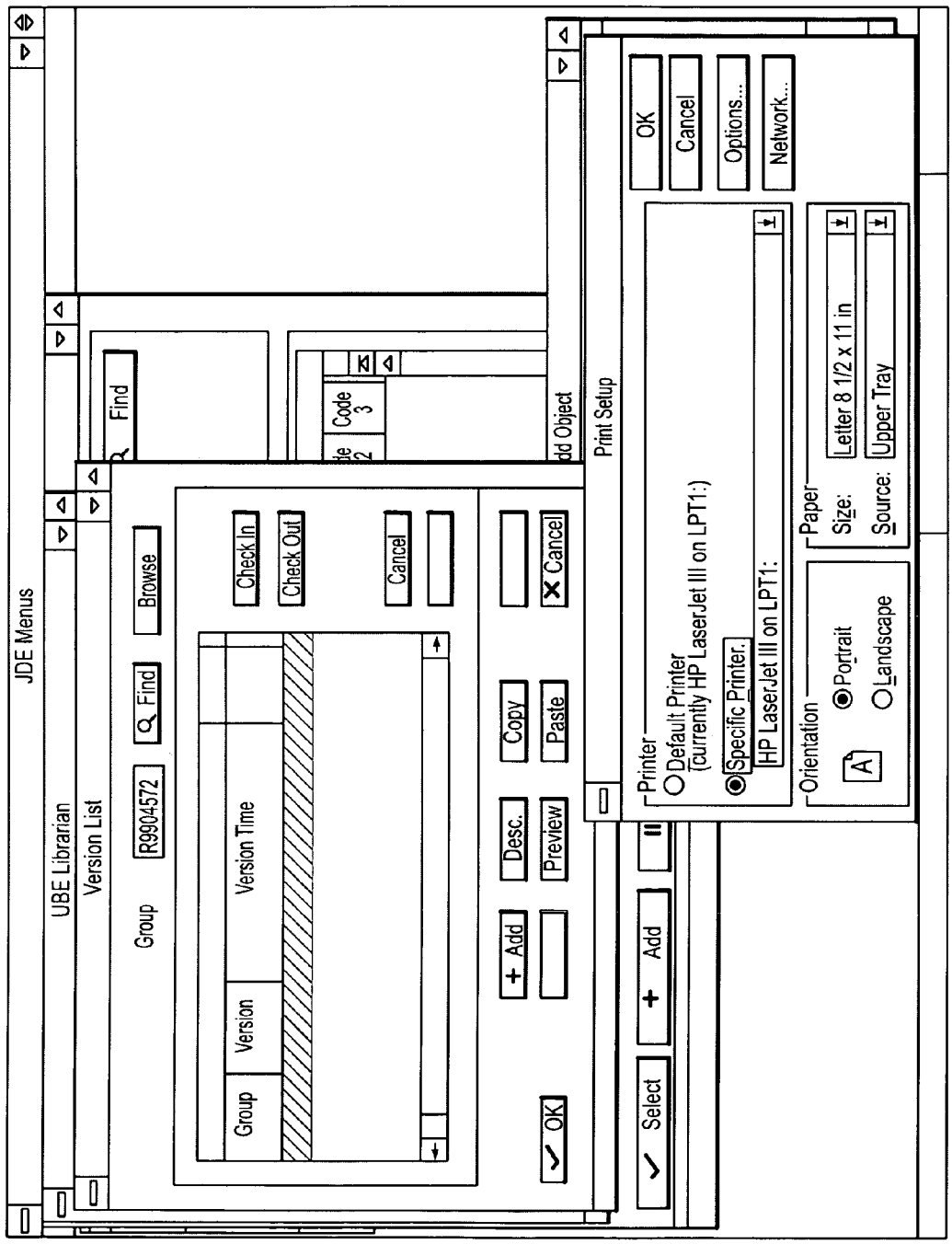
FIG. 33 is a user interface screen for setting up printing for a report.

Referring now to FIG. 33, there is shown a print setup dialog that appears when the user submits a report for execution. The user can select a printer on the network, paper orientation (portrait or landscape), and size and type of paper. An options button provides printer features that typically do not require changing, such as dot resolution and color/monochrome selection. A network button allows the user to explore a network for a printer.

Figure 34:
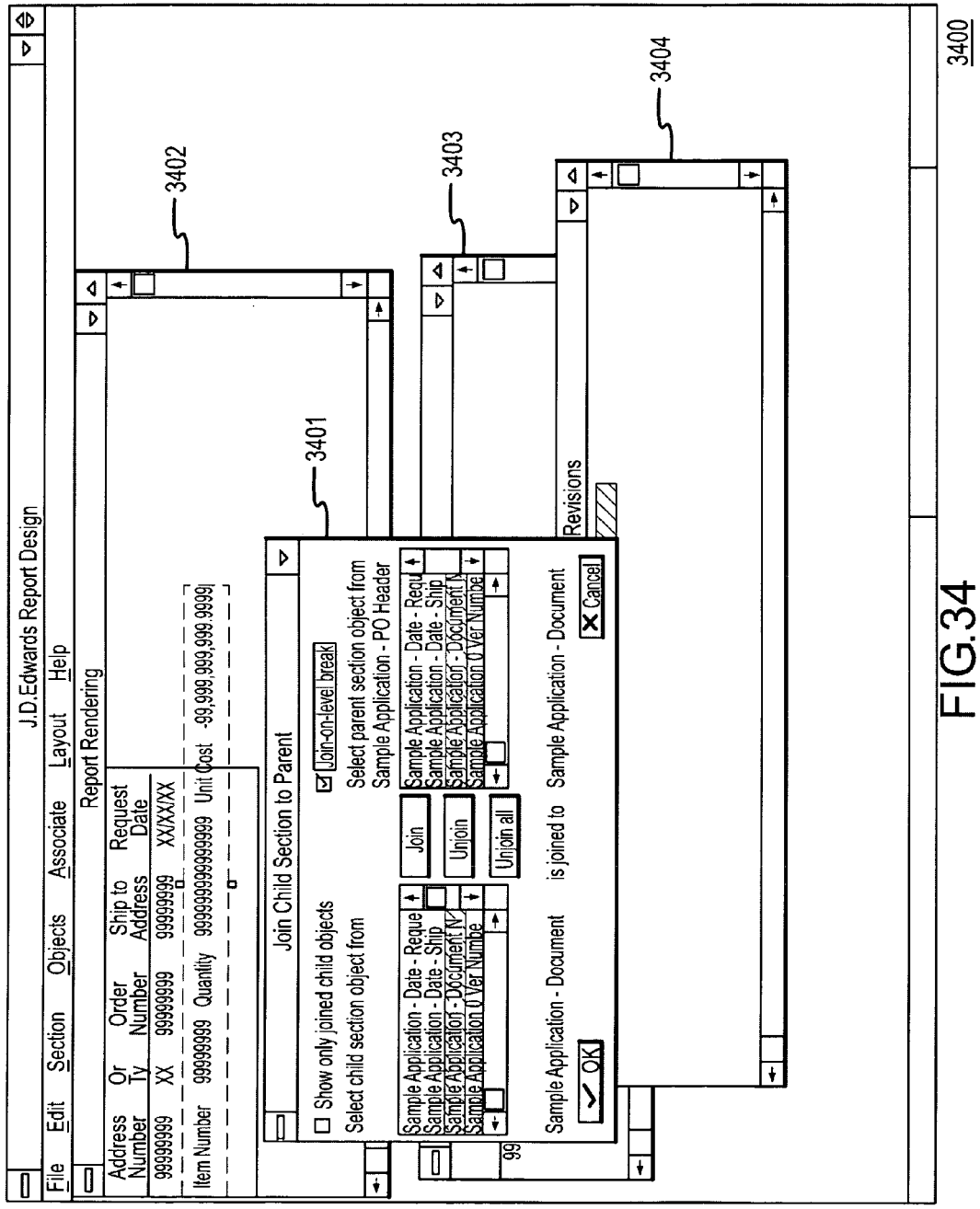
FIG. 34 is a user interface screen for joining sections.

Referring now to FIG. 34, there is shown a user interface screen 3400 for joining sections. Screen 3400 includes a join child section to parent window 3401 that allows a user to associate a child section with a parent section. Window 3401 provides the user with choices to show only joined child objects, to join on a level break, and to show all the objects in the child and parent sections that are available to be joined or unjoined. Screen 3400 also includes other windows 3402–3404, examples of which have been previously, discussed.

Figure 35:
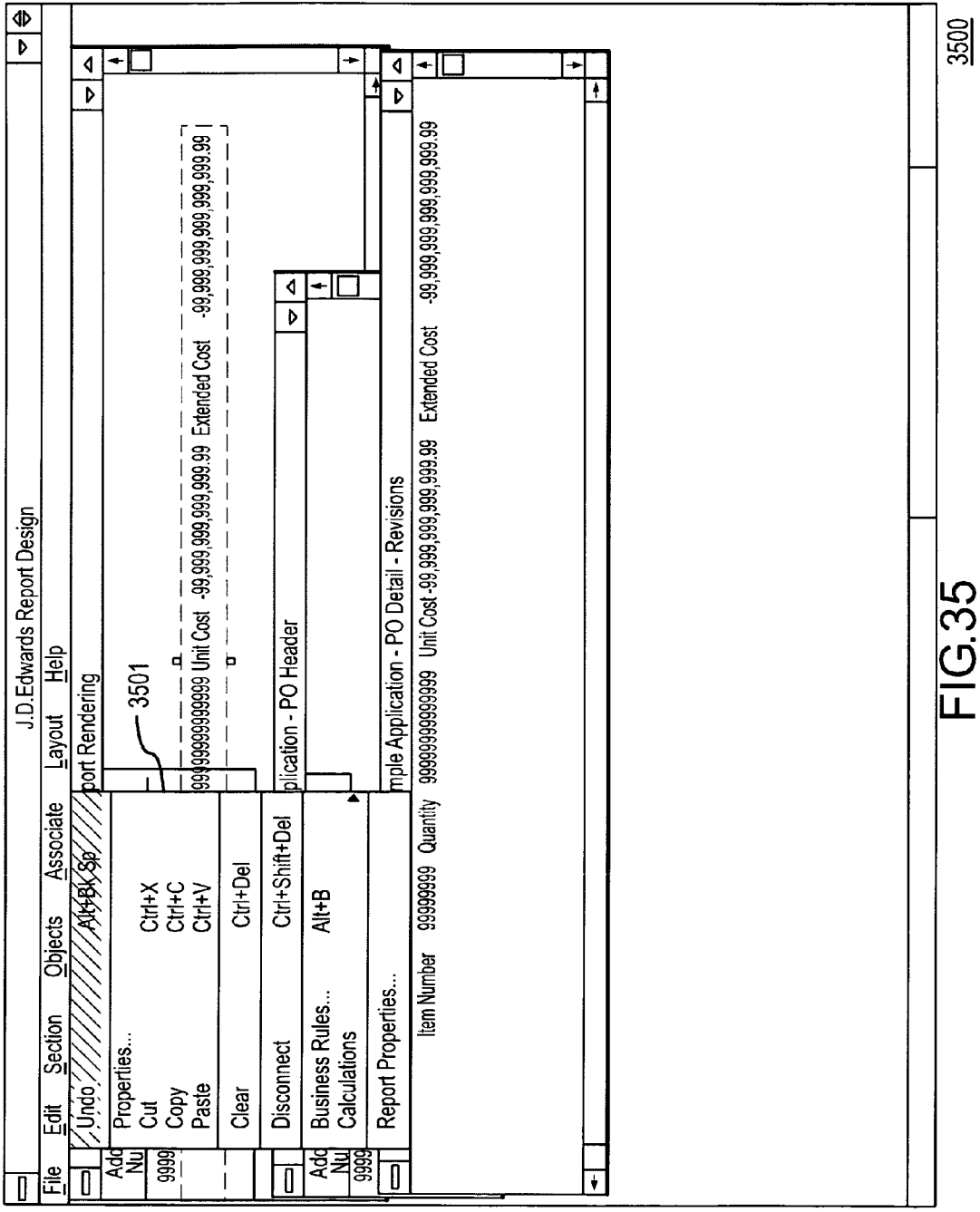
FIG. 35 is a user interface screen for selecting business rules.
Figure 36:
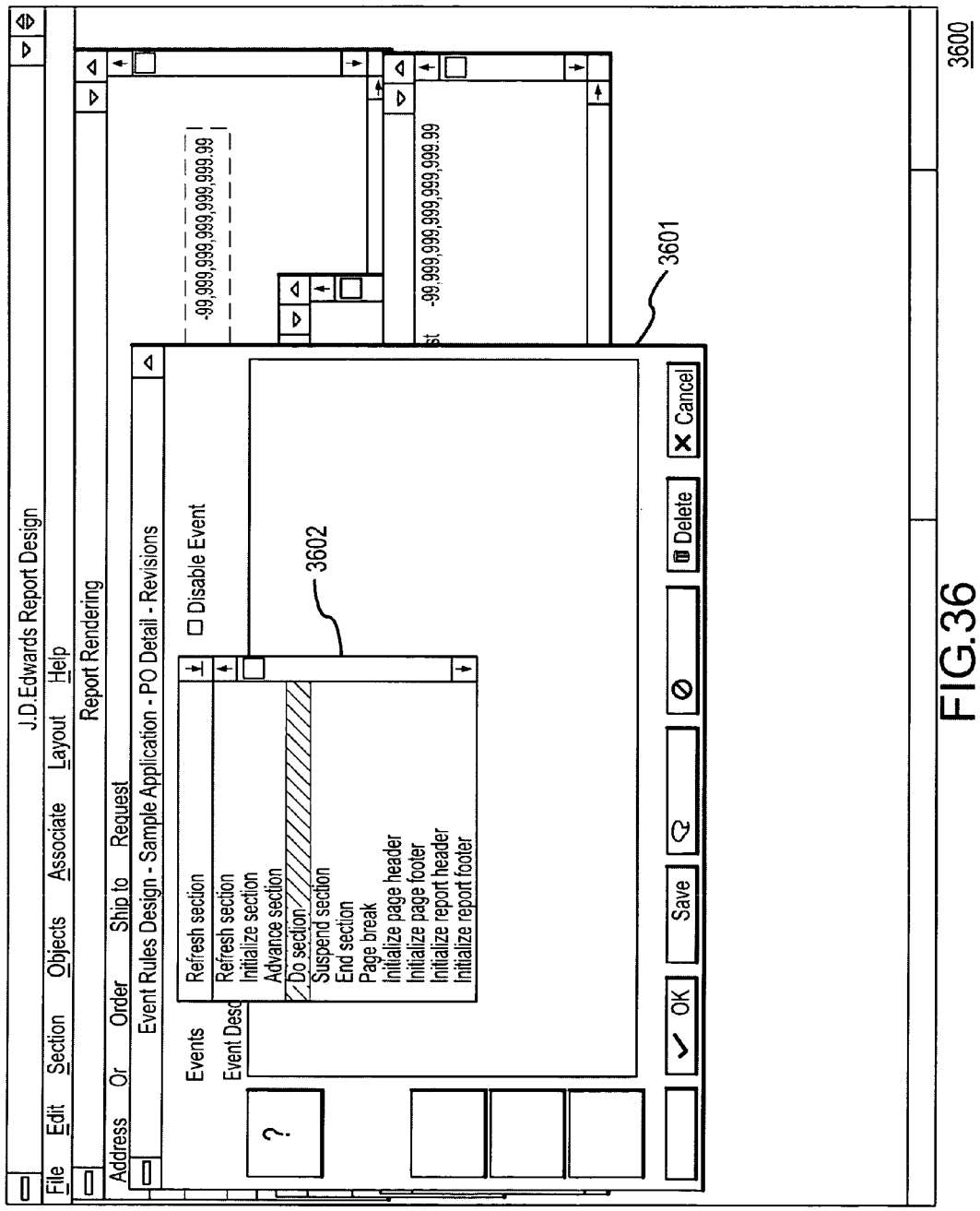
FIG. 36 is a user interface screen for event rules design.

Referring now to FIG. 35, there is shown a user interface screen 3500 for selecting business rules. Screen 3500 includes an edit menu 3501 that permits the user to select a business rules choice. Referring now also to FIG. 36, there is shown a user interface screen 3600 for event rules design. Screen 3600 includes an event rules design window 3601 in which the user may initiate the process of attaching custom code to an event. Window 3601 further provides a menu 3602 in which the user may select at what event during processing the custom code should be executed. In the example of FIG. 36, the DO_SECTION event is selected. This event occurs at the start of printing a section, before any objects in the section have been printed.

Figure 37:
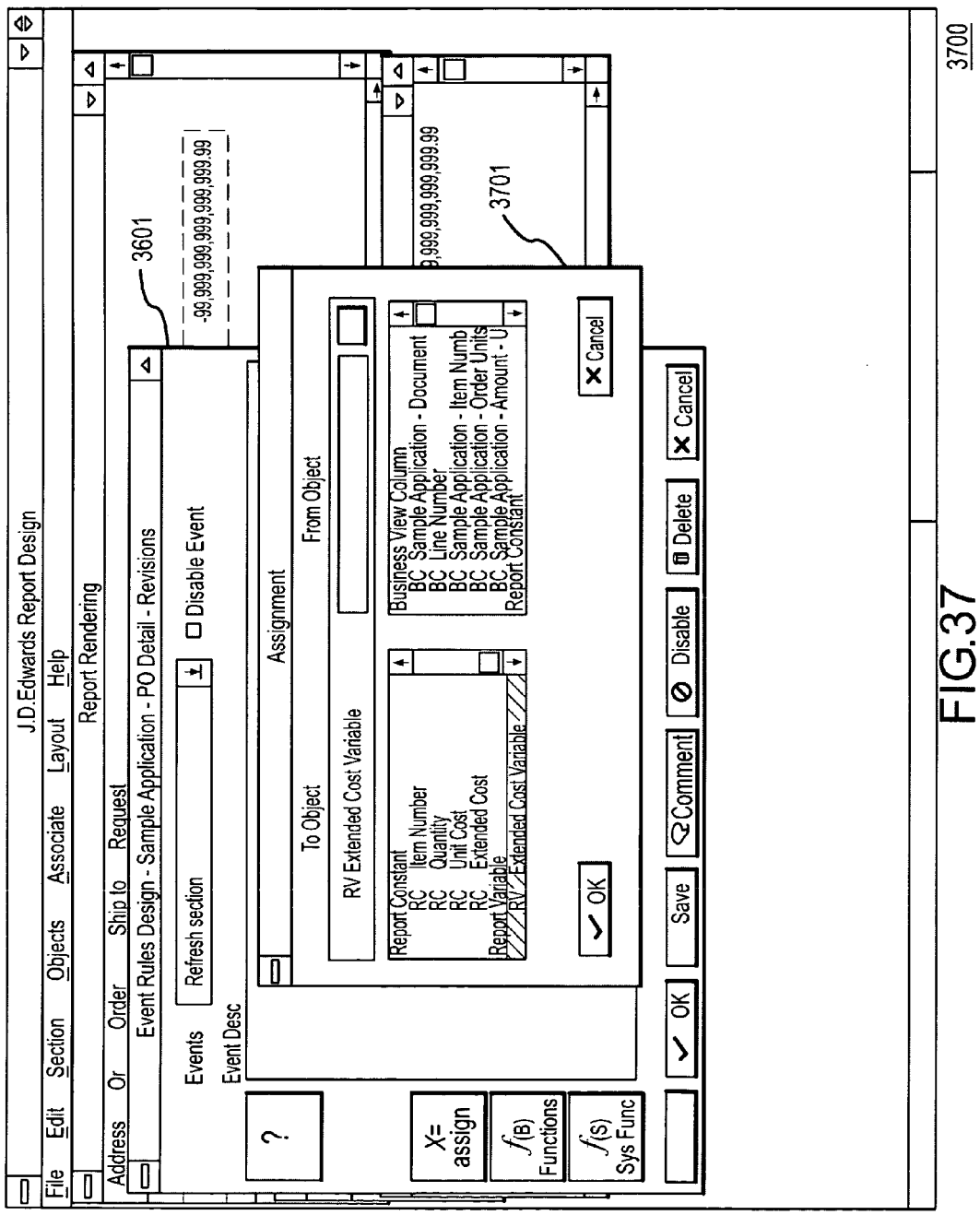
FIG. 37 is a user interface screen for designing a calculation.

Referring now to FIG. 37, there is shown a user interface screen 3700 for designing a calculation. Screen 3700 includes an assignment window 3701 that allows a user to connect custom code to an event. In the example of FIG. 37, the user has selected an assignment by pressing an "assign" button. Performing an assignment involves selecting a target from a left-hand listing box and a source from aright-hand listing box. The left-hand box shows all objects that are available to the section for assignment. The right-hand box shows only those objects that are valid for assignment to the selected target object. Thus, a user connects such custom code without resorting to any C-language programming. Pressing a "sysfunc" button of window 3601 allows the user to perform certain system level functions such as hiding or showing a section or skipping a database record, again without the need for any C-language programming. The user can also add conditional statements to the custom code such as if/else logic or while loops without writing C-language code by pressing an if/while button of window 3601. The user can also perform complex calculations without writing C-language code by pressing an "f(x)" button on window 3701. Where additional functionality is desired beyond the capabilities already mentioned, the user can press the functions button and select a business function, i.e., custom C-language code for a desired task.

Figure 38:
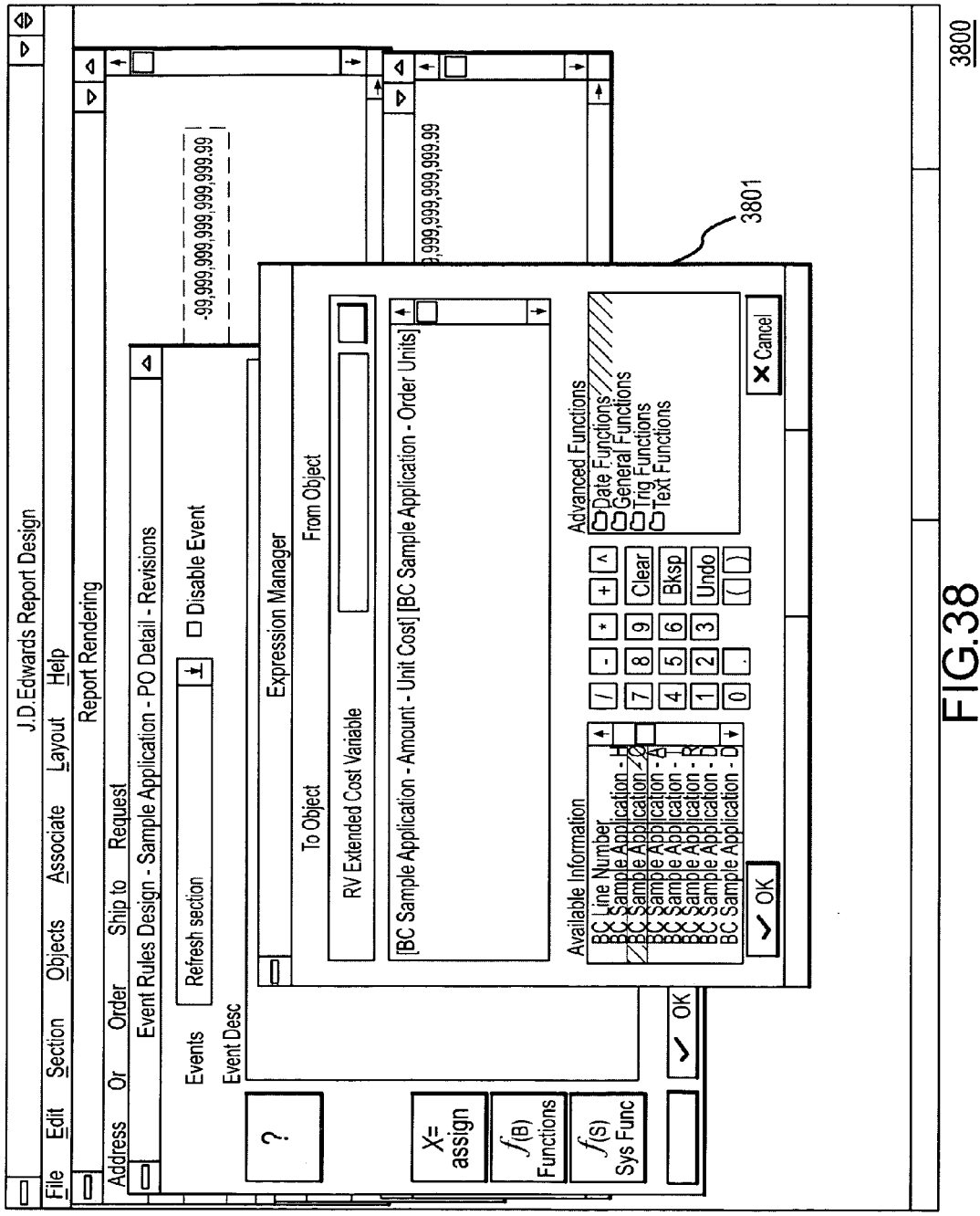
FIG. 38 is a user interface screen for an expression manager.

Referring now to FIG. 38, there is shown a user interface screen 3800 for an expression manager. Screen 3800 includes an expression manager window 3801 that allows a user to define complex expressions by selecting objects from a list of available objects and pressing operation buttons. Advanced functions, such as trigonometric functions, are also selectable from a separate submenu.

Figure 39:
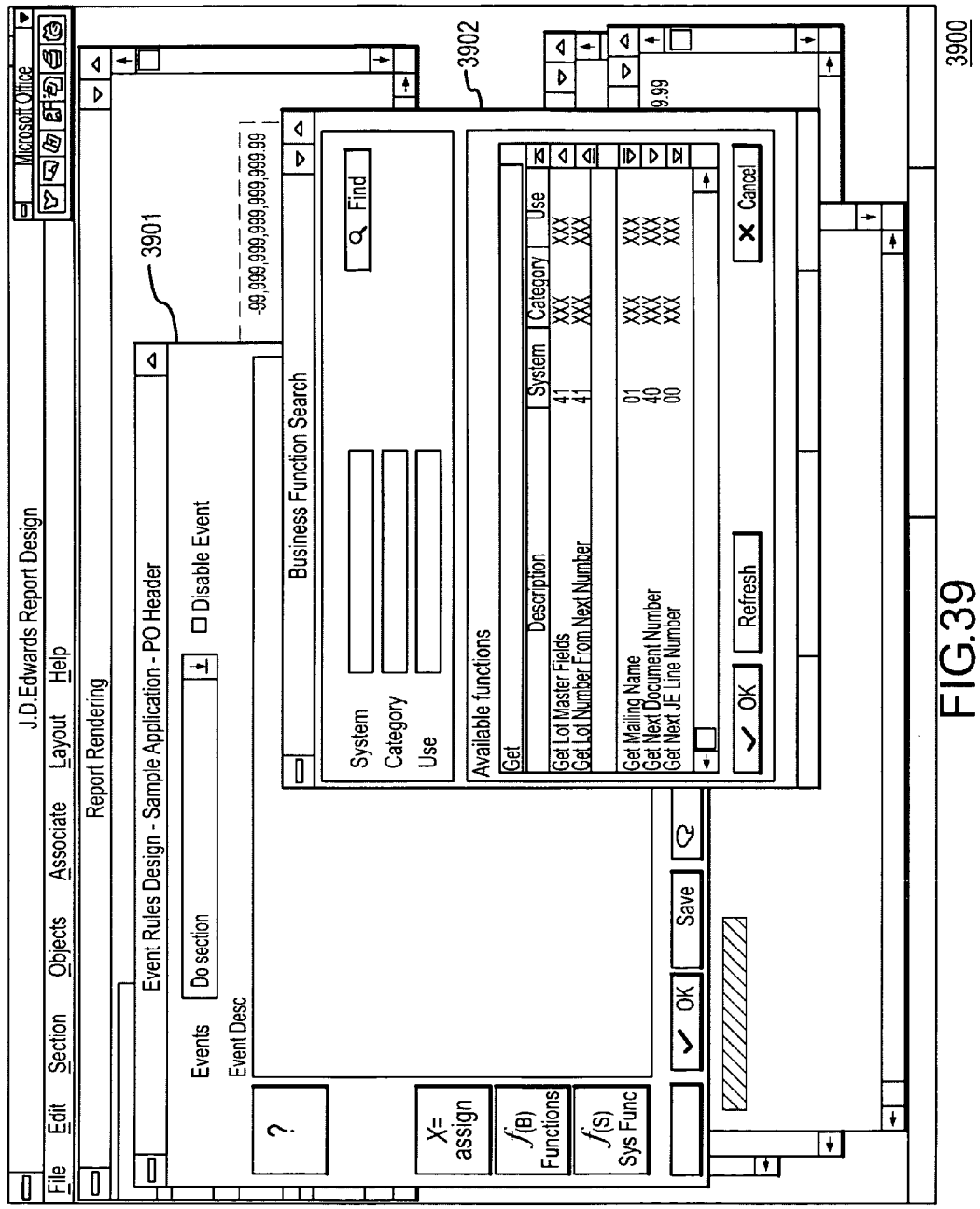
FIG. 39 is a user interface screen for a business function search.

Referring now to FIG. 39, there is shown a user interface screen 3900 for a business function search. Screen 3900 includes a PO header event rules design window 3901 and a business function search window 3902. Business function search window 3902 appears when a user selects a "functions" button from event rules design window 3901. Window 3902 permits a user to find and connect C-language custom code to a particular event (in this case DO_SECTION) during the processing of the report. These program modules, known as business functions, are categorized by a system code, a category code, and a use code. This categorization, along with a textual description, facilitates location of a desired business function in a repository that may include hundreds of such business functions.

Figure 40:
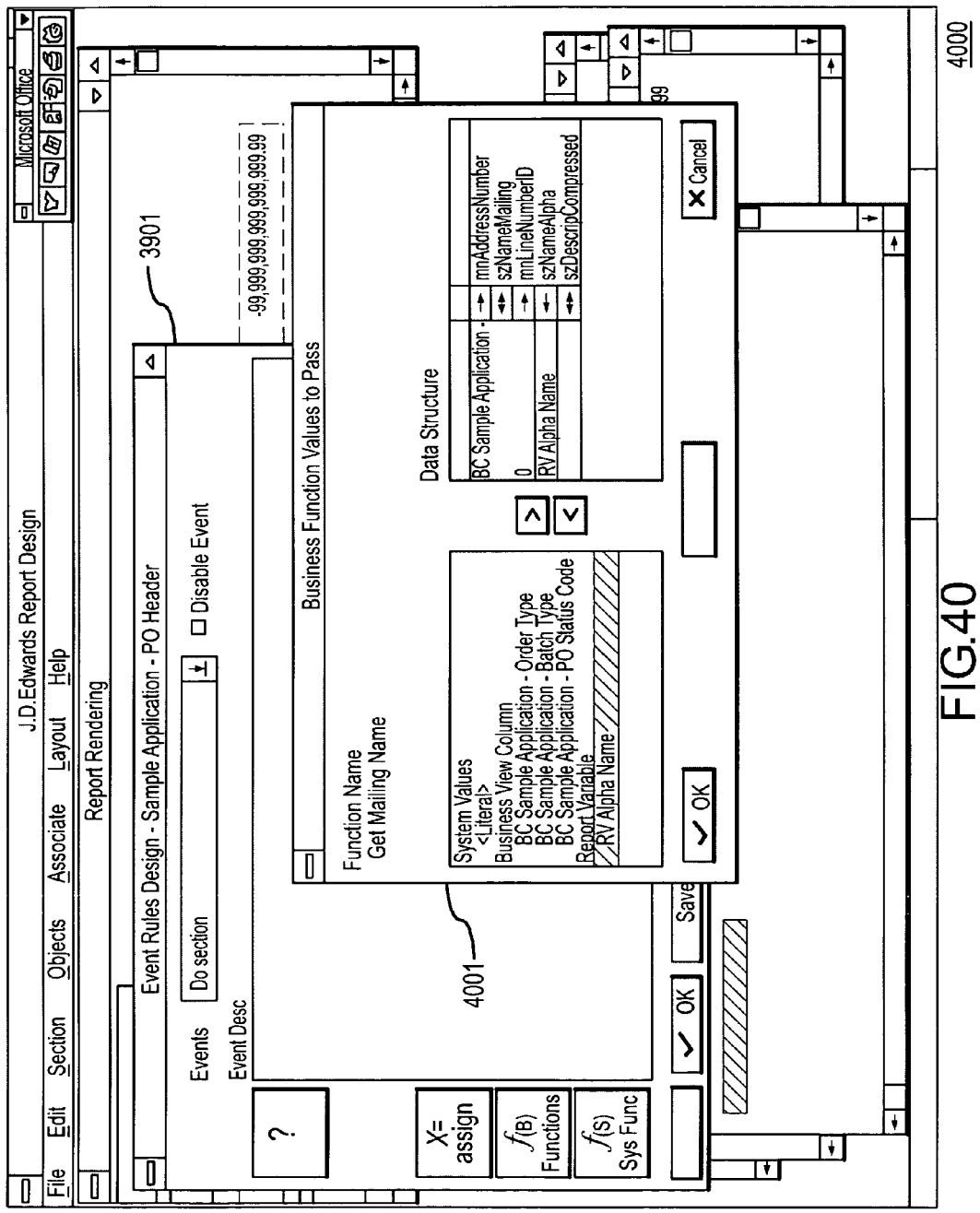
FIG. 40 is a user interface screen for passing values in a business function.

Referring now to FIG. 40, there is shown a user interface screen 4000 for passing values in a business function. Screen 4000 includes a business function-values to pass window 4001 that appears after selecting a business function. Most business functions require certain parameters to be provided. For example, a function that performs depreciation calculations requires a depreciation method parameter so that the function can perform the appropriate calculation. Window 4001 allows the user to map objects available to the section to the parameters required by the business function. Screen 4000 also includes previously described window 3901.

Figure 41:
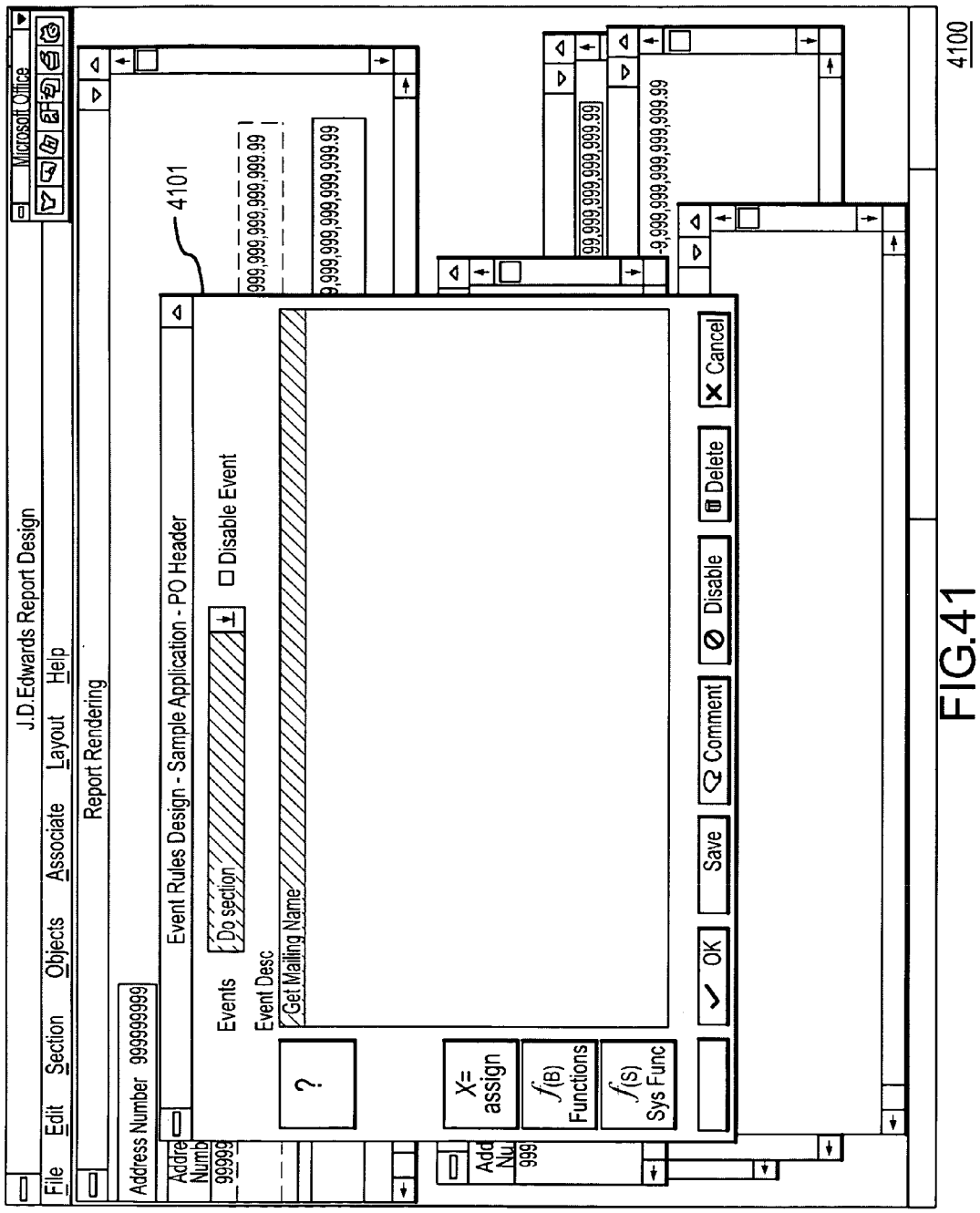
FIG. 41 is a user interface screen for displaying an event rule.

Referring now to FIG. 41, there is shown a user interface screen 4100 for displaying an event rule. Screen 4100 includes an event rules design window 4101 that shows the entire custom code definition connected to an event after completing the processing described in connection with FIGS. 37–40. In the example illustrated in FIG. 41, a business function will be called.

From the above description, it will be apparent that the invention disclosed herein provides a novel and advantageous system for enterprise-wide data processing using a batch processing engine. The foregoing discussion discloses and describes merely exemplary methods and embodiments of the present invention.

As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A batch processing engine comprising:
 a design tool subsystem operable on a first computer and configured to generate, based on user input, first specifications for a batch application;
 at least one database subsystem configured to provide access for the batch application to a database comprising data to be used by the batch application;
 a specification server subsystem separate from the at least one database subsystem and configured to store the first specifications;
 a processing subsystem configured to execute the batch application based on the first specifications; and
 a middleware subsystem configured to communicate the first specifications within the batch processing engine;
 wherein the processing subsystem comprises a first processing subsystem executing on the first computer and a second processing subsystem executing on a server computer, and wherein a user is provided an option to choose whether the batch application should execute on the first processing system or on the second processing system.

2. The batch processing engine of claim 1 wherein the design tool subsystem is configured to generate a template based on the first specifications and wherein the specification server subsystem is configured to store the template.

3. The batch processing engine of claim 2 further comprising another design tool subsystem configured to generate, based on the template, second specifications for the batch application.

4. The batch processing engine of claim 3 further comprising another processing subsystem configured to execute the batch application based on the second specifications.

5. The batch processing engine of claim 1 wherein the batch application comprises a report application.

6. The batch processing engine of claim 1 further comprising a middleware an input subsystem configured to perform input functions for the batch application.

7. The batch processing engine of claim 1 further comprising a middleware an output subsystem configured to perform output functions for the batch application.

8. The batch processing engine of claim 7, wherein the middleware output subsystem is configured to route an output data stream to one of a plurality of output devices and convert the data stream to a format suitable thereto.

9. The batch processing engine of claim 1 wherein the middleware subsystem is configured to communicate the first specifications from the design tool subsystem to the specification server subsystem.

10. The batch processing engine of claim 1 wherein the middleware subsystem is configured to communicate the first specifications from the specification server subsystem to the processing subsystem.

11. A method of operating a batch processing engine, the method comprising:
 in a design tool subsystem operable on a first computer, generating, based on user input, first specifications for a batch application;
 storing the first specifications in a specification server subsystem;
 in a processing subsystem operable on the first computer or a server computer, executing the batch application based on the first specifications, wherein executing the batch application comprises interacting with at least one database server via a database subsystem, and wherein the at least one database is separate from the specification server subsystem; and
 communicating the first specifications within the batch processing engine using a middleware subsystem subsystem; and
 allowing a user to select whether the batch application should execute on the first computer or on the second computer.

12. The method of claim 11 further comprising:
 in the design tool subsystem, generating a template based on the first specifications; and
 storing the template in the specification server subsystem.

13. The method of claim 12 further comprising in another design tool subsystem, generating second specifications for the batch application based on the template.

14. The method of claim 13 further comprising in another processing subsystem, executing the batch application based on the second specifications.

15. The method of claim 11 wherein the batch application comprises a report application.

16. The method of claim 11 further comprising in an a middleware input subsystem, performing input functions for the batch application.

17. The method of claim 11 further comprising in an a middleware output subsystem, performing output functions for the batch application.

18. The method of claim 11 further comprising in a the database subsystem, providing access for the batch application to a database.

19. The method of claim 11 further comprising communicating the first specifications from the design tool subsystem to the specification server subsystem.

20. The method of claim 11 further comprising communicating the first specifications from the specification server subsystem to the processing subsystem.

* * * * *

UNITED STATES PATENT AND TRADEMARK OFFICE
CERTIFICATE OF CORRECTION

| | | |
|---|---|---|
| PATENT NO. | : 7,085,803 B1 | Page 1 of 1 |
| APPLICATION NO. | : 10/007547 | |
| DATED | : August 1, 2006 | |
| INVENTOR(S) | : Harry E. Shisler and Kevin D. Reitz | |

It is certified that error appears in the above-identified patent and that said Letters Patent is hereby corrected as shown below:

Claim 6, Col. 23, lines 63-65: should read
    6. The batch processing engine of claim 1 further comprising a middleware input subsystem configured to perform input functions for the batch application.

Claim 7, Col. 24, lines 1-3:
    7. The batch processing engine of claim 1 further comprising a middleware output subsystem configured to perform output functions for the batch application.

Signed and Sealed this

Twenty-second Day of May, 2007

JON W. DUDAS
*Director of the United States Patent and Trademark Office*